United States Patent
Tanaka et al.

(10) Patent No.: US 11,258,626 B2
(45) Date of Patent: Feb. 22, 2022

(54) HEATING COOKING SYSTEM

(71) Applicant: Sharp Kabushiki Kaisha, Sakai (JP)

(72) Inventors: Minoru Tanaka, Sakai (JP); Masaya Uchiyama, Sakai (JP); Mari Nishide, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 319 days.

(21) Appl. No.: 15/119,761

(22) PCT Filed: Aug. 21, 2015

(86) PCT No.: PCT/JP2015/073594
§ 371 (c)(1),
(2) Date: Aug. 18, 2016

(87) PCT Pub. No.: WO2016/035584
PCT Pub. Date: Mar. 10, 2016

(65) Prior Publication Data
US 2017/0063567 A1     Mar. 2, 2017

(30) Foreign Application Priority Data

Sep. 5, 2014   (JP) .............................. JP2014-181509

(51) Int. Cl.
*H04L 12/28*    (2006.01)
*F24C 7/08*     (2006.01)
(Continued)

(52) U.S. Cl.
CPC ............ *H04L 12/2823* (2013.01); *F24C 7/08* (2013.01); *G08C 17/02* (2013.01); *H04L 12/282* (2013.01);
(Continued)

(58) Field of Classification Search
CPC .......... F24C 7/08; F24C 7/02; H04L 12/2818; H04L 12/282; H04L 12/2823;
(Continued)

(56) References Cited

U.S. PATENT DOCUMENTS 4,816,635 A * 3/1989 Edamura .............. H05B 6/6438
                                                       219/489
5,204,768 A * 4/1993 Tsakiris ................... G06F 3/00
                                                      340/12.23
(Continued)

FOREIGN PATENT DOCUMENTS

JP     2003-316669 A     11/2003
JP     2005-037067 A      2/2005
(Continued)

OTHER PUBLICATIONS

Official Communication issued in International Patent Application No. PCT/JP2015/073594, dated Nov. 2, 2015.

*Primary Examiner* — Eric S Stapleton
(74) *Attorney, Agent, or Firm* — Keating & Bennett, LLP

(57) ABSTRACT

A heating cooking system includes a cooking device (100), servers (400, 500) for communicating with the cooking device (100) via a communication network and an information terminal (300) for communicating with the servers (400, 500) via the communication network. The servers (400, 500) have a communication tool manager (400) for managing communication tools of the information terminal (300) for users. The cooking device (100) has posting sections for posting information relating to executed cooking menus to the communication tool manager (400) of the servers (400, 500) via the communication network (N).

3 Claims, 16 Drawing Sheets

(51) Int. Cl.
*H05B 6/64* (2006.01)
*H05B 6/66* (2006.01)
*G08C 17/02* (2006.01)

(52) U.S. Cl.
CPC ...... *H04L 12/2818* (2013.01); *H04L 12/2825* (2013.01); *H05B 6/6435* (2013.01); *H05B 6/668* (2013.01); *G08C 2201/40* (2013.01); *G08C 2201/93* (2013.01); *H04L 2012/285* (2013.01)

(58) Field of Classification Search
CPC . H04L 2012/285; H05B 6/6435; H05B 6/668; H04M 11/00; H04Q 9/00; G08C 17/02; G08C 2201/40; G08C 2201/93
USPC ........................................................ 219/412
See application file for complete search history.

(56) References Cited

U.S. PATENT DOCUMENTS

| | | | | |
|---|---|---|---|---|
| 5,500,794 A * | 3/1996 | Fujita | H02J 13/001 | 340/4.33 |
| 5,699,039 A * | 12/1997 | Korzen | G08B 7/068 | 340/286.09 |
| 5,758,081 A * | 5/1998 | Aytac | H04M 11/06 | 709/212 |
| 5,839,115 A * | 11/1998 | Coleman | G06Q 10/087 | 705/15 |
| 5,845,263 A * | 12/1998 | Camaisa | G06Q 30/04 | 705/15 |
| 5,913,210 A * | 6/1999 | Call | G06Q 20/201 | |
| 6,014,634 A * | 1/2000 | Scroggie | G06Q 20/12 | 705/14.25 |
| 6,121,593 A * | 9/2000 | Mansbery | A47J 27/62 | 219/495 |
| 6,175,860 B1 * | 1/2001 | Gaucher | H04B 3/54 | 340/12.32 |
| 6,208,976 B1 * | 3/2001 | Kinebuchi | G06Q 10/087 | 705/15 |
| 6,301,564 B1 * | 10/2001 | Halverson | G06Q 30/02 | 705/15 |
| 6,341,268 B2 * | 1/2002 | Walker | G06Q 10/087 | 705/15 |
| 6,359,270 B1 * | 3/2002 | Bridson | G06Q 10/107 | 219/679 |
| 6,420,687 B1 * | 7/2002 | Ozawa | H05B 6/6438 | 219/702 |
| 6,498,567 B1 * | 12/2002 | Grefenstette | G08C 17/02 | 340/12.24 |
| 6,550,681 B1 * | 4/2003 | Ross | H05B 6/6438 | 219/506 |
| 6,636,835 B2 * | 10/2003 | Ragsdale-Elliott | G06Q 20/20 | 705/15 |
| 6,817,757 B1 * | 11/2004 | Wallace | F24C 7/08 | 340/870.17 |
| 6,949,729 B1 * | 9/2005 | Ishikawa | H05B 6/688 | 219/702 |
| 7,072,945 B1 * | 7/2006 | Nieminen | G08C 17/02 | 455/41.2 |
| 7,092,988 B1 * | 8/2006 | Bogatin | F24C 15/325 | 219/702 |
| 7,094,995 B2 * | 8/2006 | Mills | H05B 6/6435 | 219/492 |
| 7,200,683 B1 * | 4/2007 | Wang | H04L 12/2803 | 709/250 |
| 7,203,736 B1 * | 4/2007 | Burnett | H04L 12/2803 | 709/219 |
| 7,351,941 B2 * | 4/2008 | Kim | H05B 6/688 | 219/702 |
| 7,418,413 B1 * | 8/2008 | Benson | G06Q 50/12 | 705/15 |
| 7,490,024 B2 * | 2/2009 | Marzaro | H04B 3/54 | 340/540 |
| 7,549,947 B2 * | 6/2009 | Hickman | G06F 19/3481 | 482/8 |
| 7,577,719 B2 * | 8/2009 | Yoon | H04L 12/2803 | 709/203 |
| 7,610,559 B1 * | 10/2009 | Humpleman | H04L 12/2803 | 715/733 |
| 7,640,327 B2 * | 12/2009 | Humpleman | H04L 12/2803 | 348/461 |
| 7,660,722 B2 * | 2/2010 | Ozawa | G06Q 30/02 | 705/1.1 |
| 7,685,256 B2 * | 3/2010 | Kudo | G06Q 30/02 | 709/203 |
| 7,697,927 B1 * | 4/2010 | Owens | G08C 17/02 | 455/420 |
| 7,716,248 B2 * | 5/2010 | Kadambi | H04N 21/235 | 707/793 |
| 7,813,831 B2 * | 10/2010 | McCoy | G06F 9/545 | 700/198 |
| 7,831,899 B2 * | 11/2010 | Humpleman | H04L 12/2805 | 709/217 |
| 7,865,567 B1 * | 1/2011 | Hendricks | G06Q 30/06 | 709/214 |
| 7,865,568 B1 * | 1/2011 | Redi | G08C 17/02 | 709/217 |
| 7,894,474 B1 * | 2/2011 | Bell | G08C 19/28 | 370/466 |
| 8,032,833 B1 * | 10/2011 | Wang | H04L 12/40091 | 715/733 |
| 8,224,892 B2 * | 7/2012 | Bogatin | F24C 15/325 | 700/211 |
| 8,365,306 B2 * | 1/2013 | Maes | G06Q 30/04 | 726/30 |
| 8,477,007 B2 * | 7/2013 | McCoy | G06F 9/54 | 219/702 |
| 8,537,983 B1 * | 9/2013 | Haggerty | H04M 11/00 | 379/88.14 |
| 8,548,856 B2 * | 10/2013 | Maruszak | G06Q 30/02 | 705/15 |
| 8,659,978 B2 * | 2/2014 | Schroeder | G06Q 10/08 | 219/385 |
| 8,687,544 B2 * | 4/2014 | Liu | H04W 28/0268 | 370/328 |
| 8,816,828 B2 * | 8/2014 | Ebrom | G06F 9/54 | 340/12.23 |
| 8,912,471 B2 * | 12/2014 | Shigeoka | H05B 6/1218 | 219/385 |
| 9,001,819 B1 * | 4/2015 | Or-Bach | H04L 65/4015 | 370/352 |
| 9,003,317 B2 * | 4/2015 | Beaudet | D06F 93/00 | 715/751 |
| 9,055,618 B2 * | 6/2015 | Bunzel | H05B 6/6435 | |
| 9,060,083 B2 * | 6/2015 | Tanaka | H04N 1/00408 | |
| 9,317,882 B2 * | 4/2016 | Bosko | H04W 4/70 | |
| 9,401,822 B2 * | 7/2016 | McCoy | H04L 12/66 | |
| 9,668,603 B2 * | 6/2017 | Barkhouse | A47J 27/62 | |
| 9,832,821 B2 * | 11/2017 | Unagami | G06Q 99/00 | |
| 10,067,482 B2 * | 9/2018 | Hepperla | G05B 11/01 | |
| 10,127,585 B1 * | 11/2018 | Jones | G06Q 30/02 | |
| 2002/0026325 A1 * | 2/2002 | Hirahara | G06Q 10/10 | 705/1.1 |
| 2002/0031120 A1 * | 3/2002 | Rakib | G08B 13/19656 | 370/386 |
| 2002/0038165 A1 * | 3/2002 | McHale, IV | G06Q 30/02 | 700/216 |
| 2002/0044225 A1 * | 4/2002 | Rakib | G08B 13/19656 | 348/734 |
| 2002/0059637 A1 * | 5/2002 | Rakib | G08B 13/19656 | 725/119 |
| 2002/0107933 A1 * | 8/2002 | Choi | H04L 12/2803 | 709/208 |
| 2002/0140571 A1 * | 10/2002 | Hayes | G08C 17/02 | 340/13.31 |
| 2002/0140855 A1 * | 10/2002 | Hayes | G08C 17/02 | 348/465 |
| 2002/0143805 A1 * | 10/2002 | Hayes | G06F 1/1626 | 345/169 |

(56) References Cited

U.S. PATENT DOCUMENTS

| | | | |
|---|---|---|---|
| 2002/0147647 A1* | 10/2002 | Ragsdale-Elliott | G06Q 20/20 705/15 |
| 2003/0058843 A1* | 3/2003 | Nishikawa | H04L 12/2803 370/352 |
| 2003/0080113 A1* | 5/2003 | Williamson | H05B 6/688 219/506 |
| 2003/0171113 A1* | 9/2003 | Choi | H04L 12/2803 455/420 |
| 2003/0182209 A1* | 9/2003 | Ge | G06Q 30/02 705/15 |
| 2003/0233424 A1* | 12/2003 | Seo | G08C 17/02 709/217 |
| 2004/0003073 A1* | 1/2004 | Krzyzanowski | H04L 12/2803 709/223 |
| 2004/0005044 A1* | 1/2004 | Yeh | H04L 12/2803 379/142.01 |
| 2004/0049771 A1* | 3/2004 | Yu | H04L 12/2803 717/172 |
| 2004/0068441 A1* | 4/2004 | Werbitt | G06Q 20/20 705/16 |
| 2004/0099144 A1* | 5/2004 | Kudo | G06Q 30/06 99/325 |
| 2004/0103153 A1* | 5/2004 | Chang | H04L 12/2803 709/206 |
| 2004/0117843 A1* | 6/2004 | Karaoguz | H04L 12/2803 725/108 |
| 2005/0055716 A1* | 3/2005 | Louie | G06F 1/1632 725/58 |
| 2005/0085180 A1* | 4/2005 | Ballay | G06F 3/0231 455/1 |
| 2005/0125083 A1* | 6/2005 | Kiko | G05B 15/02 700/19 |
| 2005/0262226 A1* | 11/2005 | Holloway | G08C 19/28 709/221 |
| 2006/0031457 A1* | 2/2006 | Motoyama | H04L 12/2803 709/224 |
| 2006/0045107 A1* | 3/2006 | Kucenas | H04L 12/2803 370/401 |
| 2006/0227761 A1* | 10/2006 | Scott, III | H04L 12/2803 370/352 |
| 2006/0272028 A1* | 11/2006 | Maes | G06Q 30/04 726/27 |
| 2007/0158335 A1* | 7/2007 | Mansbery | F24C 7/082 219/505 |
| 2007/0241945 A1* | 10/2007 | Moorer | H04L 12/2807 341/50 |
| 2008/0041233 A1* | 2/2008 | Bunn | A47J 31/007 99/281 |
| 2008/0221715 A1* | 9/2008 | Krzyzanowski | H04L 12/2805 700/90 |
| 2008/0282182 A1* | 11/2008 | Oosaka | H04L 12/2803 715/772 |
| 2009/0013210 A1* | 1/2009 | McIntosh | H04L 41/0672 714/4.1 |
| 2010/0031162 A1* | 2/2010 | Wiser | G06Q 30/0255 715/747 |
| 2010/0146395 A1* | 6/2010 | Reyes | H04L 12/282 715/734 |
| 2011/0176524 A1* | 7/2011 | Fasbender | H04L 12/2809 370/338 |
| 2011/0185342 A1* | 7/2011 | Argue | G06F 8/10 717/113 |
| 2011/0247052 A1* | 10/2011 | Kim | H04L 12/2805 726/4 |
| 2011/0291971 A1* | 12/2011 | Masaki | G06F 1/1626 345/173 |
| 2011/0298596 A1* | 12/2011 | Warrick | G06F 21/305 340/12.53 |
| 2011/0312278 A1* | 12/2011 | Matsushita | H04L 12/40013 455/66.1 |
| 2012/0009914 A1* | 1/2012 | Lee | H04L 12/2814 455/420 |
| 2012/0056755 A1* | 3/2012 | Hanft | H04Q 9/00 340/870.07 |
| 2012/0108230 A1* | 5/2012 | Stepanian | G06F 21/10 455/422.1 |
| 2012/0240082 A1* | 9/2012 | Chen | G08C 17/02 715/823 |
| 2012/0254926 A1* | 10/2012 | Takahashi | H04N 21/4331 725/98 |
| 2012/0309311 A1* | 12/2012 | Ohira | G08C 17/02 455/41.1 |
| 2013/0014159 A1* | 1/2013 | Wiser | G06Q 30/0255 725/34 |
| 2013/0049607 A1* | 2/2013 | Urata | G08C 17/02 315/153 |
| 2013/0066635 A1* | 3/2013 | Kim | H04L 41/0806 704/270.1 |
| 2013/0092032 A1* | 4/2013 | Cafferty | F24C 7/08 99/325 |
| 2013/0110261 A1* | 5/2013 | Lee | H04L 12/2814 700/23 |
| 2013/0201316 A1* | 8/2013 | Binder | H04L 67/12 348/77 |
| 2013/0214935 A1* | 8/2013 | Kim | H04L 12/2816 340/870.02 |
| 2013/0247117 A1* | 9/2013 | Yamada | G08C 17/02 725/93 |
| 2013/0311610 A1* | 11/2013 | Kim | H04L 12/2818 709/217 |
| 2014/0067094 A1* | 3/2014 | Park | G05B 15/02 700/90 |
| 2014/0067131 A1* | 3/2014 | Park | A47L 15/4293 700/275 |
| 2014/0074537 A1* | 3/2014 | Bargetzi | G08C 17/02 705/7.19 |
| 2014/0087660 A1* | 3/2014 | Kim | H04L 12/282 455/41.1 |
| 2014/0095164 A1* | 4/2014 | Sone | H04L 51/16 704/260 |
| 2014/0172123 A1* | 6/2014 | Lee | G05B 15/02 700/17 |
| 2014/0186050 A1* | 7/2014 | Oshima | H04B 10/1143 398/118 |
| 2014/0335490 A1* | 11/2014 | Baarman | A61B 5/002 434/236 |
| 2015/0074554 A1* | 3/2015 | Sasaki | G06F 3/0481 715/753 |
| 2015/0077326 A1* | 3/2015 | Kramer | G06F 3/0325 345/156 |
| 2015/0088671 A1* | 3/2015 | Xiong | G06Q 30/016 705/15 |

FOREIGN PATENT DOCUMENTS

| | | |
|---|---|---|
| JP | 2008-134019 A | 6/2008 |
| JP | 2013-218376 A | 10/2013 |
| WO | 2011/145381 A1 | 11/2011 |
| WO | 2014/112362 A1 | 7/2014 |

* cited by examiner

HEATING COOKING SYSTEM

TECHNICAL FIELD

The present invention relates to a heating cooking system.

BACKGROUND ART

Conventionally, there has been provided a supervisory control system composed of a supervisory control terminal, a chat server, and appliance-side terminals provided in a plurality of appliances, respectively (see, e.g., JP 2003-316669 A (PTL1)). This supervisory control system, with use of a chat program, implements remote supervisory control over a household electrical appliance from a supervisory control terminal via a network.

CITATION LIST

Patent Literature

PTL1: JP 2003-316669 A

SUMMARY OF INVENTION

Technical Problem

However, in the above-described supervisory control system, the chat server delivers supervisory-control-request information from the supervisory control terminal to the appliance-side terminal. Then, the supervisory control system receives a supervisory-control-state information resulting from supervisory control executed by the appliance-side terminal based on the supervisory-control-request information, and subsequently delivers received display data to the supervisory control terminal that has transmitted the supervisory-control-request information.

With such a supervisory control system as described above, as a problem unsolved, in the case where the appliance is a heating cooking device, it is impossible for a user to be notified of unique-to-cooking information by using a communication tool, without any control request from an information terminal.

Accordingly, an object of the invention is to provide a heating cooking system capable of, even without any control request from an information terminal, notifying about unique-to-cooking information from a cooking device to the user's information terminal by using a communication tool to allow great improvement of convenience.

Solution to Problem

In order to solve the problem, a heating cooking system according to the present invention comprising:
a cooking device;
servers for communicating with the cooking device via a communication network; and
an information terminal for communicating with the servers via the communication network, wherein
the servers include
a communication tool manager for managing communication tools of the information terminal for users, and
the cooking device includes
posting sections for posting information relating to executed cooking menus to the communication tool manager of the servers via the communication network.

In this connection, the term, communication tool, refers to bulletin board systems including electronic message boards, mailing lists, or the like.

In the heating cooking system of one embodiment, the information relating to executed cooking menus includes information indicative that cooking of the cooking menu has been ended.

In the heating cooking system of one embodiment, the information relating to executed cooking menus includes fail-to-extract information indicative that a cooking object has not been extracted from inside of a heating chamber of the cooking device even after a preset time elapse since a cooking end of the cooking menu.

In the heating cooking system of one embodiment, the information relating to executed cooking menus includes information relating to cooking device status of the cooking device during a course of cooking for the cooking menu.

In the heating cooking system of one embodiment, the servers comprise:
a history storage section for storing histories relating to users' dietary lives;
a cooking-menu proposing section for proposing recommended cooking menus based on the histories stored in the history storage section; and
a cooking-menu posting section for posting information relating to a recommended cooking menu proposal proposed by the cooking-menu proposing section to the communication tool manager.

In the heating cooking system of one embodiment, the histories relating to users' dietary lives stored in the history storage section of the server include cooking histories of the cooking device based on the information relating to executed cooking menus posted from the cooking device.

In the heating cooking system of one embodiment, the information terminal comprises
a meal-menu posting section for posting information relating to users' meal menus to the communication tool manager of the servers via the communication network, wherein
the histories relating to users' dietary lives stored in the history storage section of the server include the users' meal histories based on the information relating to the users' meal menus posted from the meal-menu posting section of the information terminal.

Advantageous Effects of Invention

As apparent from the above description, according to the present invention, information relating to cooking menus executed with the cooking device is posted from the posting sections of the cooking device to the communication tool manager of the servers via the communication network. Therefore, even without any control request from the information terminal, unique-to-cooking information can be notified to each user's information terminal from the cooking device by using the communication tool. Thus, there can be realized a heating cooking system capable of attaining a greatly improved convenience.

DESCRIPTION OF EMBODIMENTS

Hereinbelow, a heating cooking system of the present invention will be described in detail by embodiments thereof illustrated in the accompanying drawings.

First Embodiment

Figure 1:
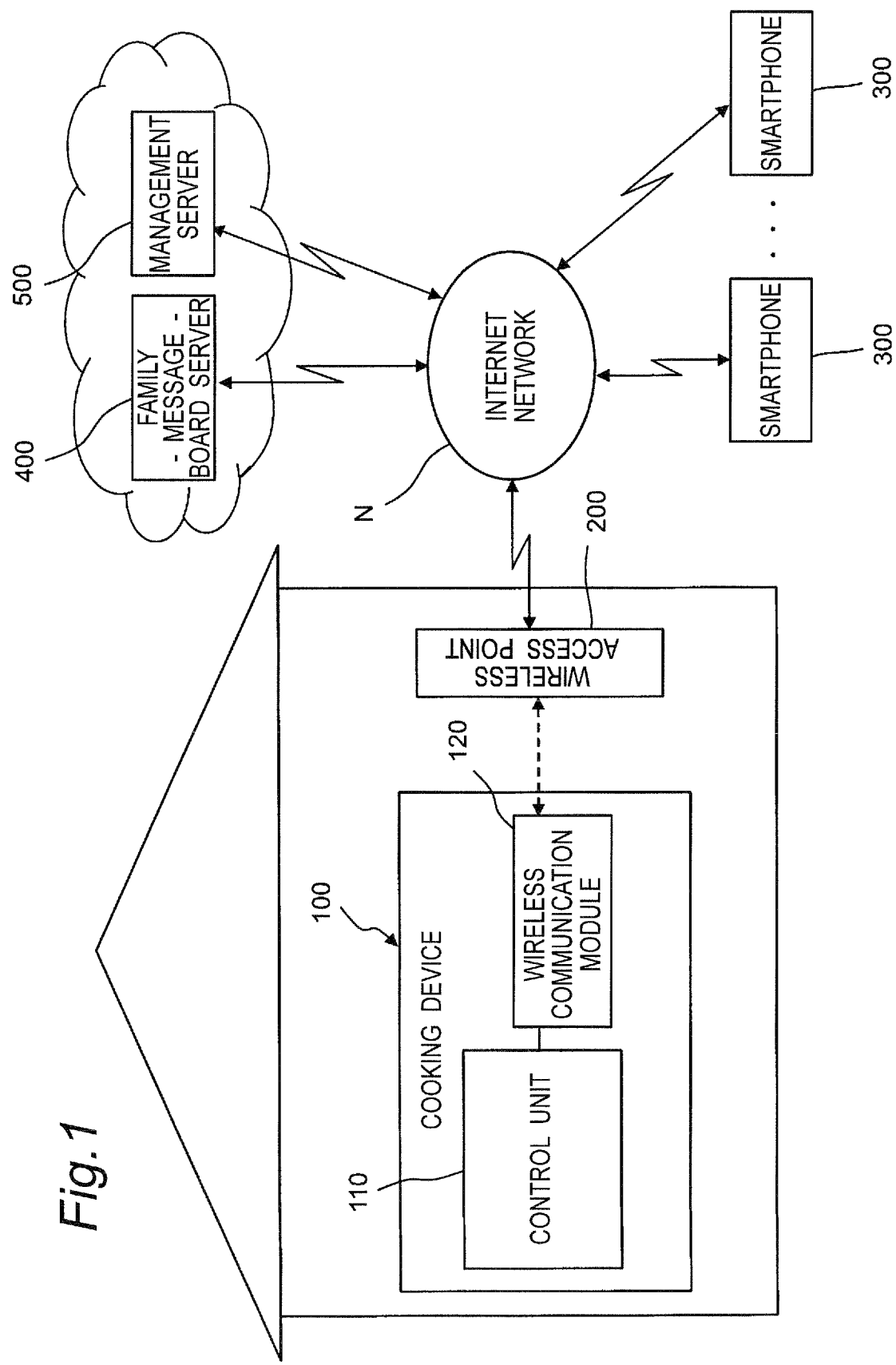
FIG. 1 is a schematic configurational view of a heating cooking system according to a first embodiment of the invention.

FIG. 1 is a schematic configurational view of a heating cooking system according to a first embodiment of the invention.

The heating cooking system includes a cooking device 100, a family-message-board server 400 for communicating with the cooking device 100, a management server 500 for communicating with the cooking device 100, the family-message-board server 400 and the like, and a plurality of smartphones 300 as an example of the information terminal for communicating with the family-message-board server 400, the management server 500 and the like. The heating cooking system may include one information terminal. The heating cooking system receives supply of weather or other information from an information providing server (not shown) via an Internet network N.

The family-message-board server 400 and the management server 500 constitute a cloud computing system, being an example of the server in the invention. Alternatively, the family-message-board server 400 and the management server 500 may be implemented by one server.

The cooking device 100 includes a wireless communication module 120 for communicating with the family-message-board server 400 and the management server 500 via a wireless access point 200 and Internet network N. The Internet network N is an example of the communication network. The wireless communication module 120 may be connected directly to the Internet network N.

The wireless communication module 120 performs communications with the indoor wireless access point 200 via wireless LAN. More specifically, by using the wireless LAN standard Wi-Fi (registered trademark) as an example of the communication standard, the wireless communication module 120 transmits and receives information to and from the outdoor family-message-board server 400 and the management server 500 via the wireless access point 200.

In this case, the family-message-board server 400 is an example of the communication tool manager which manages the communication tool (electronic message board service) for performing conversations among a plurality of users of the smartphones 300 (e.g., family members such as father, mother and children). The family message board managed by the family-message-board server 400 is a communication tool which allows not only text messages but also image/voice or other measurings to be posted and viewed.

The family-message-board server 400 is an example of the communication tool manager which manages a message board service for a group composed of particular members such as family or close relatives. However, the communication tool manager is not limited to this and may be one which manages a message board service for a group composed of particular members. The heating cooking system of the invention may include a plurality of communication tool managers.

Each smartphone 300 includes communication functions that allow information provided by various websites to be viewed or downloaded via the Internet network N. In this smartphone 300, application software (including a function of a meal-menu posting section) for using the family-message-board service is preliminarily installed. Then, the family message board managed by the family-message-board server 400 is a communication tool which, with one community formed commonly by one-household family, allows individual members of the family (e.g., father, mother, children, etc.) to write (post) and view messages by using their respective smartphones 300. Each member is allowed to carry out conversations also by using an information terminal, such as network-compatible in-home television or tablet, other than their respective smartphones 300.

Figure 2:
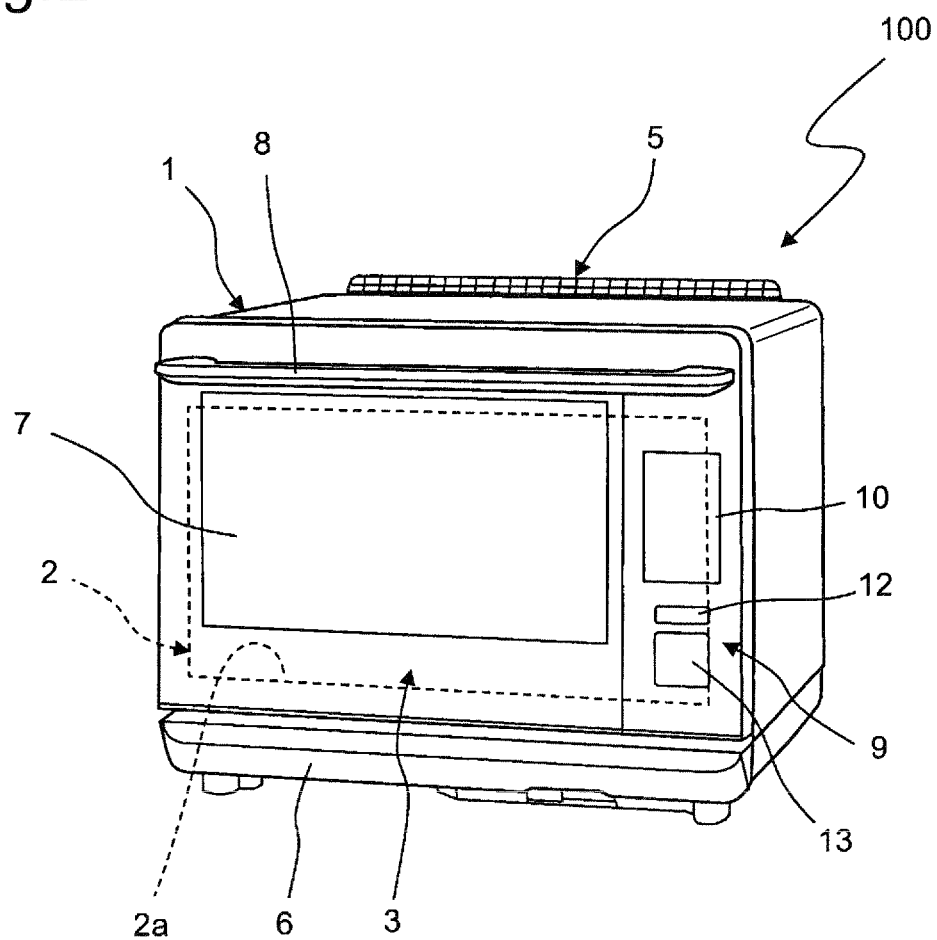
FIG. 2 is an appearance perspective view of a cooking device of the heating cooking system.

FIG. 2 is an appearance perspective view of the cooking device 100 of the heating cooking system. As shown in FIG. 2, the cooking device 100 includes a rectangular parallelepiped-shaped main casing 1, a heating chamber 2 provided in the main casing 1 and having an opening 2a on its front side, and a door 3 for opening and closing the opening 2a of the heating chamber 2.

An exhaust duct 5 is provided in an upper, rear side of the main casing 1. A dew receiving container 6 is removably attached in a lower front of the main casing 1. The dew receiving container 6, located below the door 3, is enabled to receive water droplets derived from a back face (heating chamber 2-side surface) of the door 3 or a front plate of the main casing 1.

The door 3 is attached in a front face side of the main casing 1 so as to be pivotable with its lower-side edge as a pivotal axis. A transparent outer glass 7 having thermal resistance is provided in the front face (a surface opposite to the heating chamber 2-side surface) of the door 3. The door 3 also has a handle 8 positioned above the outer glass 7, and an operation panel 9 provided on a right side of the outer glass 7.

The operation panel 9 includes a color LCD (Liquid Crystal Display) part 10, a cancel key 12 to be pressed for halfway stop of heating or other occasions, and a warming start key 13 to be pressed for a start of heating.

Figure 3:
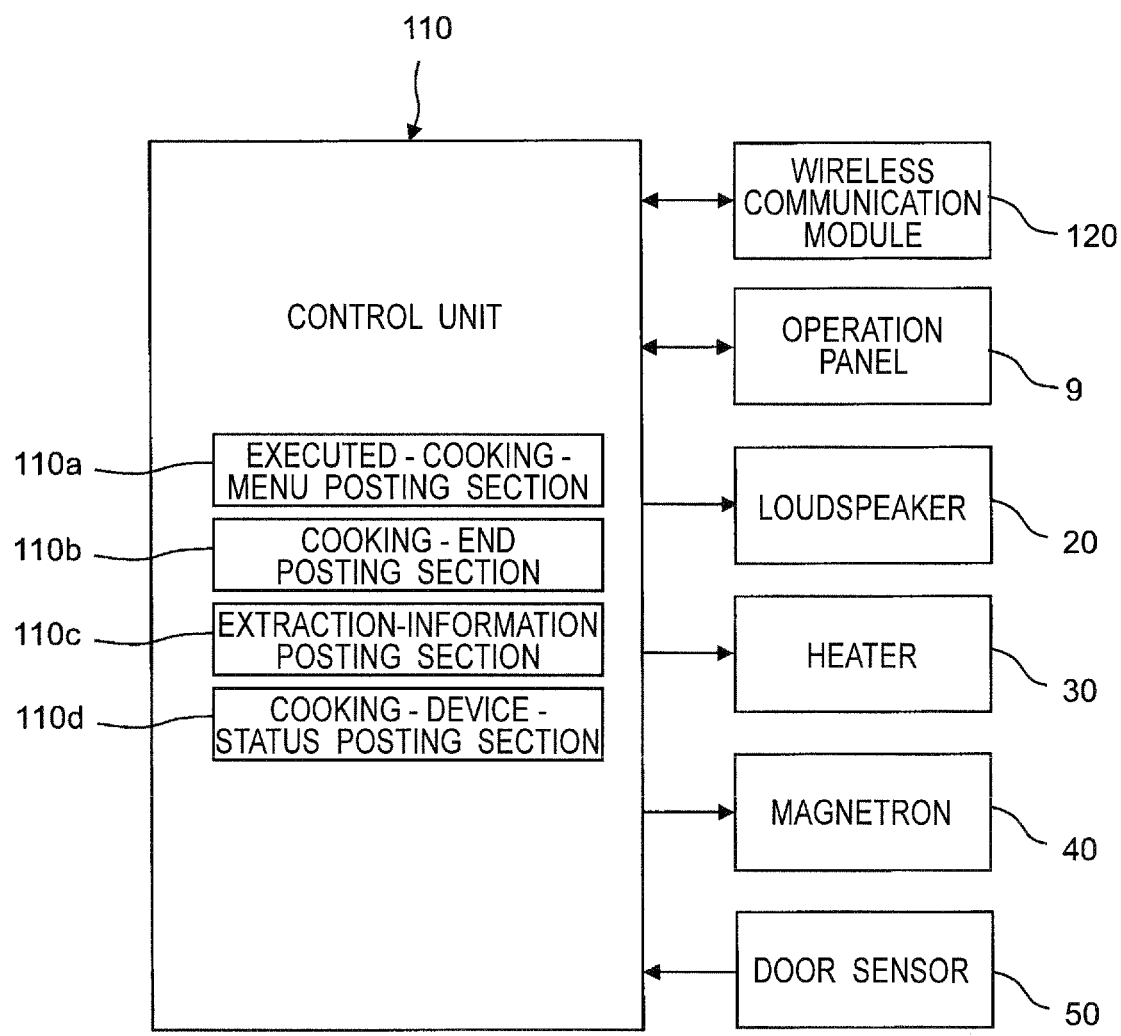
FIG. 3 is a control block diagram of the cooking device.

FIG. 3 is a control block diagram of the cooking device 100. Connected to a control unit 110 of the cooking device 100 are, as shown in FIG. 3, the wireless communication module 120, the operation panel 9, a loudspeaker 20, a heater 30, a magnetron 40, a door sensor 50, and the like. Based on signals derived from the operation panel 9, a humidity sensor (not shown), a chamber temperature sensor (not shown), the door sensor 50 and the like, the control unit 110 controls the wireless communication module 120, the color LCD part 10 of the operation panel 9, the loudspeaker 20, the heater 30, the magnetron 40, and the like.

The control unit 110, which is composed of a microcomputer, input/output circuits and the like, includes: an executed-cooking-menu posting section 110a for posting 'executed-cooking-menu information' to the family message board; a cooking-end posting section 110b for posting 'cooking-end information,' which indicates that cooking of a cooking menu has been ended, to the family message board; an extraction-information posting section 110c for posting 'fail-to-extract information,' which indicates that a cooking object has not been extracted from within the heating chamber 2, to the family message board; and a cooking-device-status posting section 110d for posting 'cooking information,' which relates to the cooking device status during cooking of a cooking menu, to the family message board.

These executed-cooking-menu posting section 110a, cooking-end posting section 110b, extraction-information posting section 110c and cooking-device-status posting section 110d constitute a posting section for posting 'information relating to executed cooking menus' or 'information relating to status of the cooking device itself' to the family message board of the family-message-board server 400.

The executed-cooking-menu posting section 110a, the cooking-end posting section 110b, the extraction-information posting section 110c and the cooking-device-status posting section 110d of the cooking device 100 are designed so as to post information to the family message board of the family-message-board server 400. However, without limitation to this, 'information relating to executed cooking menus' or 'information relating to status of the cooking device itself' may be transmitted from the cooking device 100 to the management server 500, and the management server 500 as an agency of the cooking device 100 may post the information to the family message board.

Figure 4:
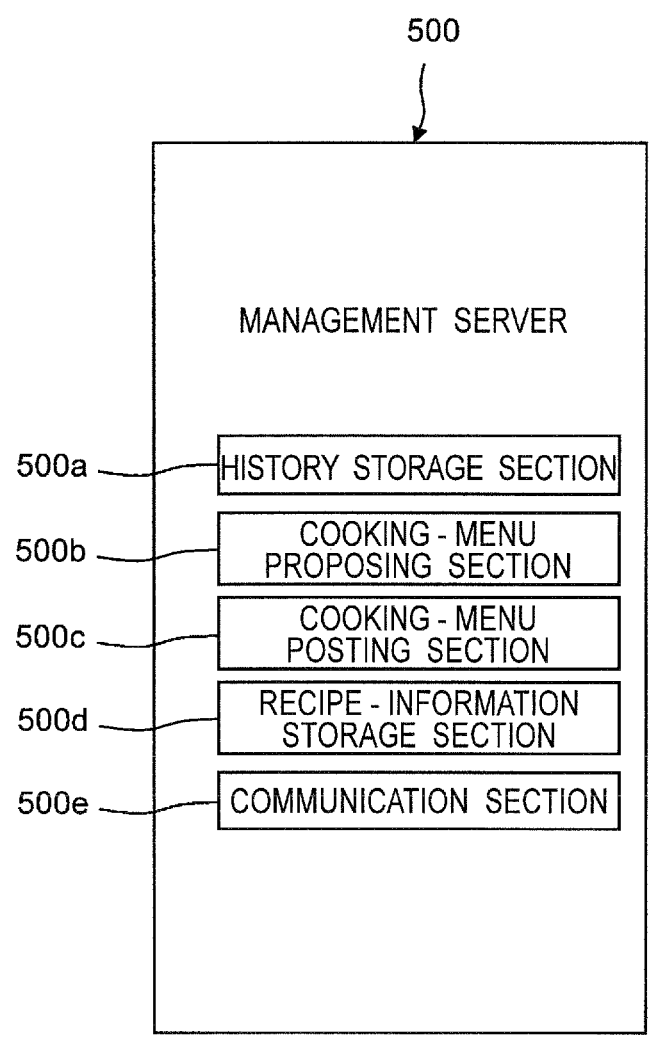
FIG. 4 is a control block diagram of a management server of the heating cooking system.

FIG. 4 is a control block diagram of the management server 500.

As shown in FIG. 4, the management server 500 includes: a history storage section 500a for storing histories relating to users' dietary lives, a cooking-menu proposing section 500b for proposing recommended cooking menus; a cooking-menu posting section 500c for posting recommended cooking menus to the family message board managed by the family-message-board server 400; a recipe-information storage section 500d for storing 'recipe information' as to cooking menus available for the cooking device 100; and a communication section 500e for performing communications via the Internet network N. In the history storage section 500a, cooking history of the cooking device 100, meal history of the user, and the like are to be stored.

The management server 500 manages a recipe site that allows 'recipe information' stored in the recipe-information storage section 500d or other information to be viewed and utilized. This recipe site is to be viewed and used by individual users of a plurality of family-message-board groups.

Alternatively, the recipe site may be managed by another information providing server. Such an information-providing server constitutes a cloud computing system in combination with the family-message-board server 400 and the management server 500.

'Information relating to executed cooking menus' or 'information relating to status of the cooking device itself' to be posted by the control unit 110 of the cooking device 100 (executed-cooking-menu posting section 110a, cooking-end posting section 110b, extraction-information posting section 110c, and cooking-device-status posting section 110d) is classified into the following four categories (1) to (4). It is noted that the 'information relating to executed cooking menus' or 'information relating to status of the cooking device itself' is not limited to these (1) to (4).

(1) Posting of Executed Cooking Menus

At a time of start or end of cooking with the cooking device 100, 'executed-cooking-menu information' is posted by the executed-cooking-menu posting section 110a of the control unit 110 via the wireless communication module 120, the wireless access point 200 and the Internet network N to the family message board managed by the family-message-board server 400.

By making it a rule to do posting to the family message board at a cooking end, it is made possible, for example, that when a course of cooking is stopped due to some misoperation or the like, cooking that has not been completed can be prevented from being excessively or unnecessarily posted to the family message board. In addition, even in the case where cooking-end conditions set inside the cooking device 100 are not satisfied on execution of a cooking menu, also when cooking has been stopped by the user's pressing of the cancel key at a time at which the cooking course has been completed to 80% or more as an example, it may be decided as a cooking end, followed by posting thereof to the family message board.

In this way, 'executed-cooking-menu information' posted from the cooking device 100 to the family message board is displayed on the screen of the smartphone 300 in which the application software for the family-message-board service has been activated. In addition, preparatorily setting ON the push-notification function of the smartphone 300 allows a posting of a message to the family message board to be notified to the smartphone 300 even when the application software for the family-message-board service has not been activated. This notification allows the user to activate the application software of the smartphone 300 to check the family message board.

In this case, 'executed-cooking-menu information' refers to all or part of heating conditions (microwave cooking, oven cooking, steam cooking, heating time, etc.) of an executed cooking menu, a menu name, cooking start time (or cooking end time), and the like.

'Executed-cooking-menu information' posted to the family-message-board server 400 is stored in the history storage section 500a as cooking history data of the management server 500.

In addition, the 'executed-cooking-menu information' may also be transmitted as cooking history data from the cooking device 100 to the management server 500 without being posted to the family message board.

(2) Posting of Cooking End

Upon a cooking end with the cooking device 100, 'cooking-end information' indicative of an end of cooking for a cooking menu is posted by the cooking-end posting section 110b of the control unit 110 via the wireless communication module 120, the wireless access point 200 and the Internet network N to the family message board of the family-message-board server 400.

Figure 5:
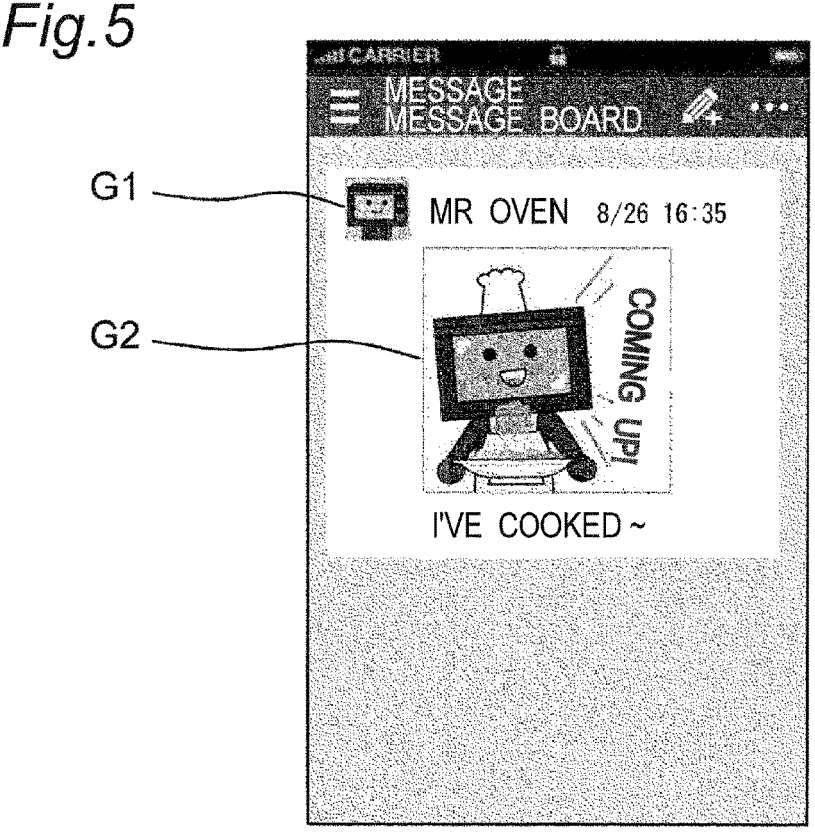
FIG. 5 is a view showing a smartphone screen in which an example of cooking-end notice posted from the cooking device is displayed on a family message board.

FIG. 5 shows a screen of the smartphone 300 in which an example of cooking-end notice posted from the cooking device 100 is displayed on the family message board.

In FIG. 5, displayed in order from upper to lower side of the screen are characters of 'MESSAGE' and 'MESSAGE BOARD,' a face image G1 of the personalized cooking device 100, characters of 'MR OVEN,' a posting time, an image G2 (seal) of the cooking device (personalized) with characters of 'COMING UP!,' and characters of 'I'VE COOKED.' In this case, the 'MESSAGE' and the 'MESSAGE BOARD' imply that the screen of the smartphone 300 displays the family message board, where messages written by members registered in the family message board are displayed in time-series order. In this family message board, the cooking device 100 as well is registered as a member.

Although 'MR OVEN' is used as a character string for designating the cooking device in the family message board, yet the designation may be set at user's discretion.

Herein, the term 'seal' refers to an image containing characters or pictures (including personalized cooking devices) or the like, where one 'seal' represents messages of notification, control, response and the like. Such a 'seal' alone may be posted as a message to the family message board, or a 'seal' and an arbitrary character string in combination may be posted to the family message board.

The cooking-end notice as 'cooking-end information' is not limited to images and characters shown in FIG. 5, and may be characters alone such as '000 (MENU ITEM) IS READY.' Also, an image of a cooking menu may be displayed in the 'cooking-end information.'

When a preset time has elapsed since the cooking-end notice, a message such as 'KEEP WARM?' may be posted from the cooking device 100 to the family message board, allowing the smartphone 300 side to select 'KEEP WARM' or 'NOT KEEP WARM.' Upon request for 'KEEP WARM' from the smartphone 300 to the cooking device 100, the inside of the heating chamber 2 can be warmed at a temperature preliminarily specified for each cooking menu by the cooking device 100 by means of a heat source such as the heater 30 (shown in FIG. 3) or the magnetron 40 so that the cooking dish can be kept from cooling.

(3) Fail-to-Extract Posting

In the control unit 110 of the cooking device 100, 'fail-to-extract information' indicative of a fail to extract the cooking object from within the heating chamber 2 is posted by the cooking-end posting section 110b via the wireless communication module 120, the wireless access point 200 and the Internet network N to the family message board managed by the family-message-board server 400.

Figure 6:
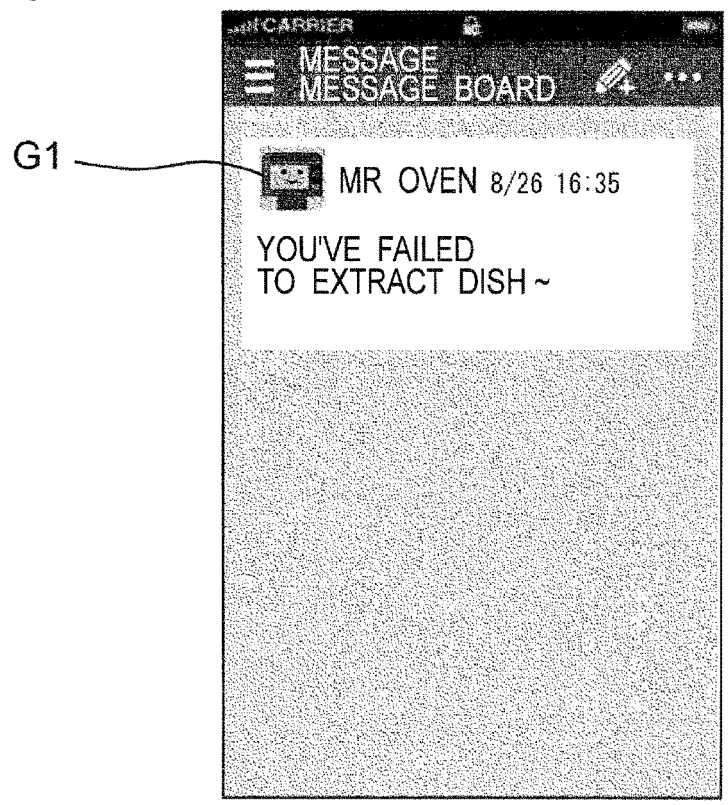
FIG. 6 is a view showing a smartphone screen in which an example of fail-to-extract notice posted from the cooking device is displayed on the family message board.

FIG. 6 shows a screen of the smartphone 300 in which an example of fail-to-extract notice posted from the cooking device 100 is displayed on the family message board. In FIG. 6, displayed in order from upper to lower side of the screen are characters of 'MESSAGE' and 'MESSAGE BOARD,' the face image G1 of the personalized cooking device 100, characters of 'MR OVEN,' a posting time, and characters of 'YOU'VE FAILED TO EXTRACT DISH.'

When the cooking object has not yet been extracted from within the heating chamber 2 even after a specified time elapse since an end of the cooking, the cooking-end posting section 110b posts the fail-to-extract notice as 'fail-to-extract information' to the family message board.

In the cooking device 100 of this embodiment, for example, a melody is outputted from the loudspeaker 20 (shown in FIG. 3) every one minute after an end of the cooking, thereby giving a notification of a fail to extract the cooked dish. After a 5 min. elapse from the cooking end, a fail-to-extract notice is posted to the family message board.

By displaying information relating to an executed cooking menu (menu name or image) simultaneously in the posting of the fail-to-extract notice, it is made possible to recognize that, for example, a cooking menu which, given a fail to extract the cooking dish, would cause smell to be increased in the cooking device 100. Then, a user who actually has not operated the cooking device 100 is allowed to give attention to a user who is considered to have operated the cooking device 100.

In addition, on the smartphone 300 side, users who do not need the 'fail-to-extract notice' are allowed to set a notice rejection. Such an option makes it possible to dissipate annoyance due to unnecessary notices (this is similarly applicable to other postings from the cooking device 100).

(4) Cooking-Device-Status Posting

In the control unit 110 of the cooking device 100, 'cooking information' relating to the cooking device status during a course of cooking for a cooking menu is posted by the cooking-device-status posting section 110d via the wireless communication module 120, the wireless access point 200 and the Internet network N to the family message board managed by the family-message-board server 400.

Figure 7:
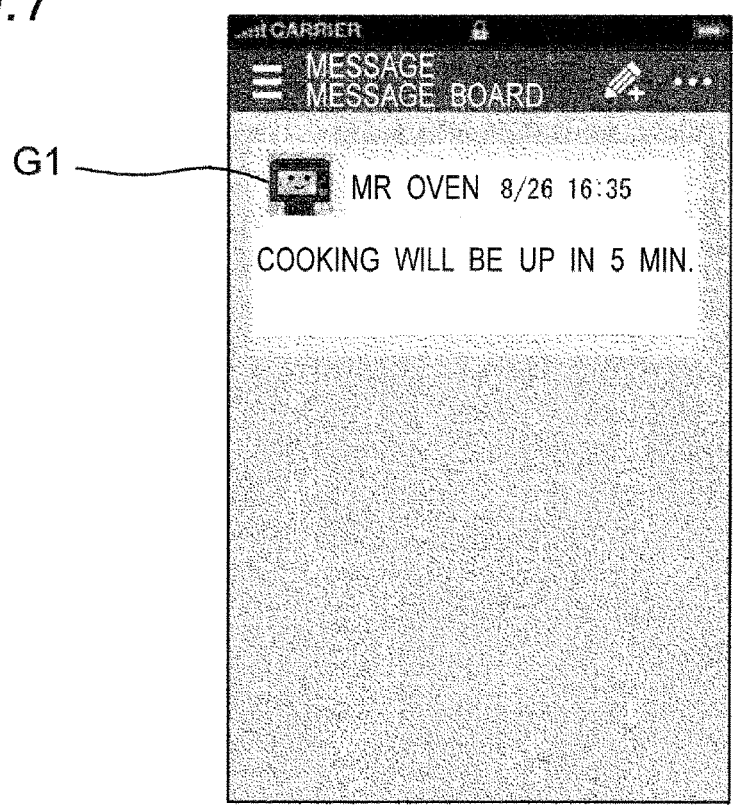
FIG. 7 is a view showing a smartphone screen in which an example of cooking-device-status notice posted from the cooking device is displayed on the family message board.

FIG. 7 shows a screen of the smartphone 300 in which an example of cooking-device-status notice posted from the cooking device 100 is displayed on the family message board. In FIG. 7, displayed in order from upper to lower side of the screen are characters of 'MESSAGE' and 'MES- SAGE BOARD,' the face image G1 of the personalized cooking device 100, characters of 'MR OVEN,' a posting time, and characters of 'COOKING WILL BE UP IN 5 MIN.'

Figure 16:
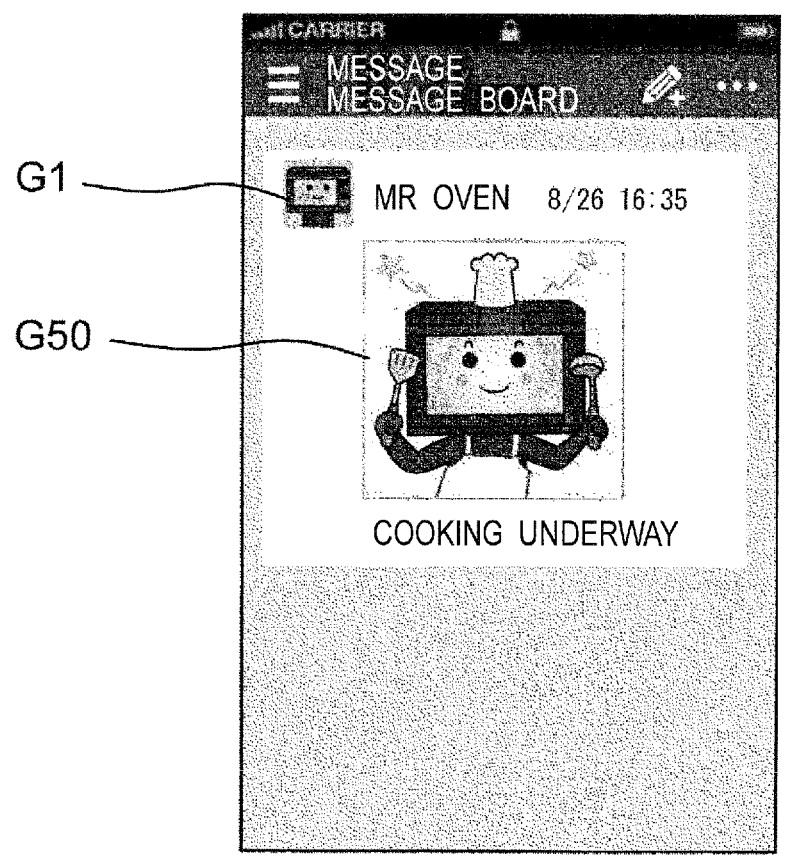
FIG. 16 is a view showing a smartphone screen in which a seal as an example of cooking-device-status notice posted from the cooking device is displayed on the family message board.

Alternatively, the cooking-device-status notice may be characters of '☐☐☐ WILL BE UP IN ○ MIN.' or, as shown in FIG. 16, a combination of an image (seal) of the cooking device (personalized) and characters of 'COOKING UNDERWAY.'

Next, operation of the management server 500 will be described. The management server 500, by means of the communication section 500e, performs communications with the smartphone 300 or the family-message-board server 400 via the Internet network N.

'Executed-cooking-menu information' posted from the control unit 110 (executed-cooking-menu posting section 110a) of the cooking device 100 is stored as a piece of cooking history in the history storage section 500a. Meal history (contents of meals other than those using the cooking device) posted from individual users of the smartphones 300 is stored in the history storage section 500a. Cooking history and meal history to be stored in the history storage section 500a are histories relating to users' dietary lives.

In this case, by application software (including functions of the family-message-board service and the meal menu posting section) installed in the smartphone 300, a user's meal history is posted in an input form of, for example, selection from within a list.

In heating-state notices, the count of heating time on the cooking device 100 side such as '☐☐☐ WILL BE UP IN ○ MIN.' may be obtained by preliminarily notifying the smartphone 300 side of a cooking start time by the family message board, acquiring a cooking time from 'recipe information' as to the cooking menu, and decrementing the time on the smartphone 300 side to present a display of '☐☐☐ WILL BE UP IN ○ MIN.' In this case, it is needless to post the heating-state notice from the cooking device 100.

Alternatively, the cooking device status may be confirmed by installing, to the smartphone 300, application software that allows the cooking-device display screen to be viewed as it is by the smartphone 300.

(5) Recommended-Cooking-Menu Proposal

The cooking-menu proposing section 500b of the management server 500 proposes recommended cooking menus based on cooking histories and meal histories stored in the history storage section 500a. Then, the recommended-cooking-menu information is posted by the cooking-menu posting section 500c to the family message board managed by the family-message-board server 400. In this case, the cooking-menu posting section 500c of the management server 500 as an agency of the cooking device 100 posts the recommended-cooking-menu information to the family message board. That is, it seems to the user that the cooking device 100 posts recommended cooking menus to the family message board of the smartphone 300.

Figure 8:
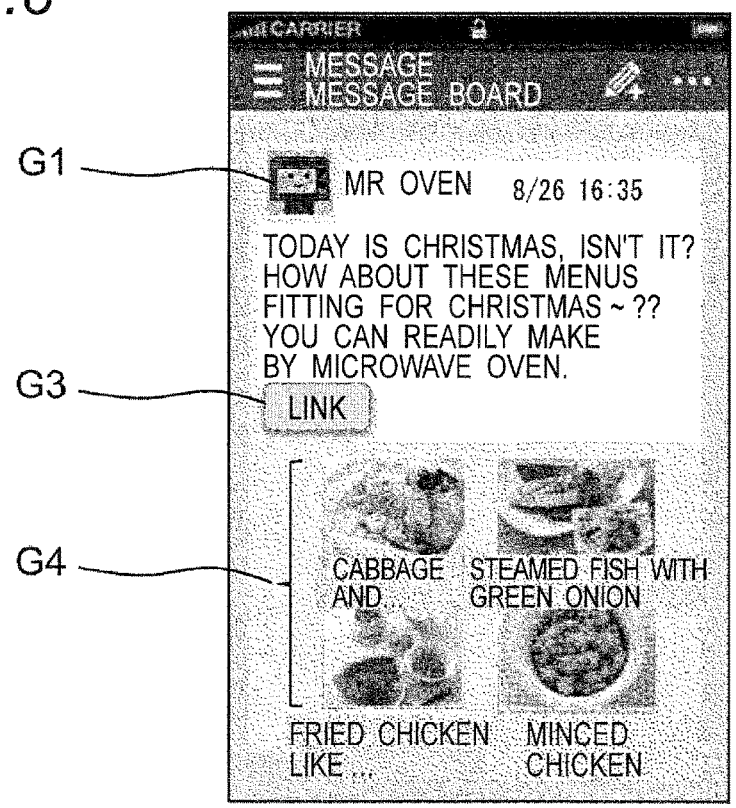
FIG. 8 is a view showing a smartphone screen in which recommended cooking menus posted from a cooking-menu proposing section of the management server are displayed on the family message board.

FIG. 8 shows a screen of the smartphone 300 in which recommended cooking menus posted from the cooking-menu posting section 500c of the management server 500 are displayed on the family message board. In FIG. 8, displayed in order from upper to lower side of the screen are characters of 'MESSAGE' and 'MESSAGE BOARD,' the face image G1 of the personalized cooking device 100, characters of 'MR OVEN,' a posting time, and characters of 'TODAY IS CHRISTMAS, ISN'T IT? HOW ABOUT THESE MENUS FITTING FOR CHRISTMAS~?? YOU CAN READILY MAKE BY MICROWAVE OVEN?,' an image G3 of a 'LINK' button, and a photo image G4 of a plurality of recommended cooking menus.

Figure 9:
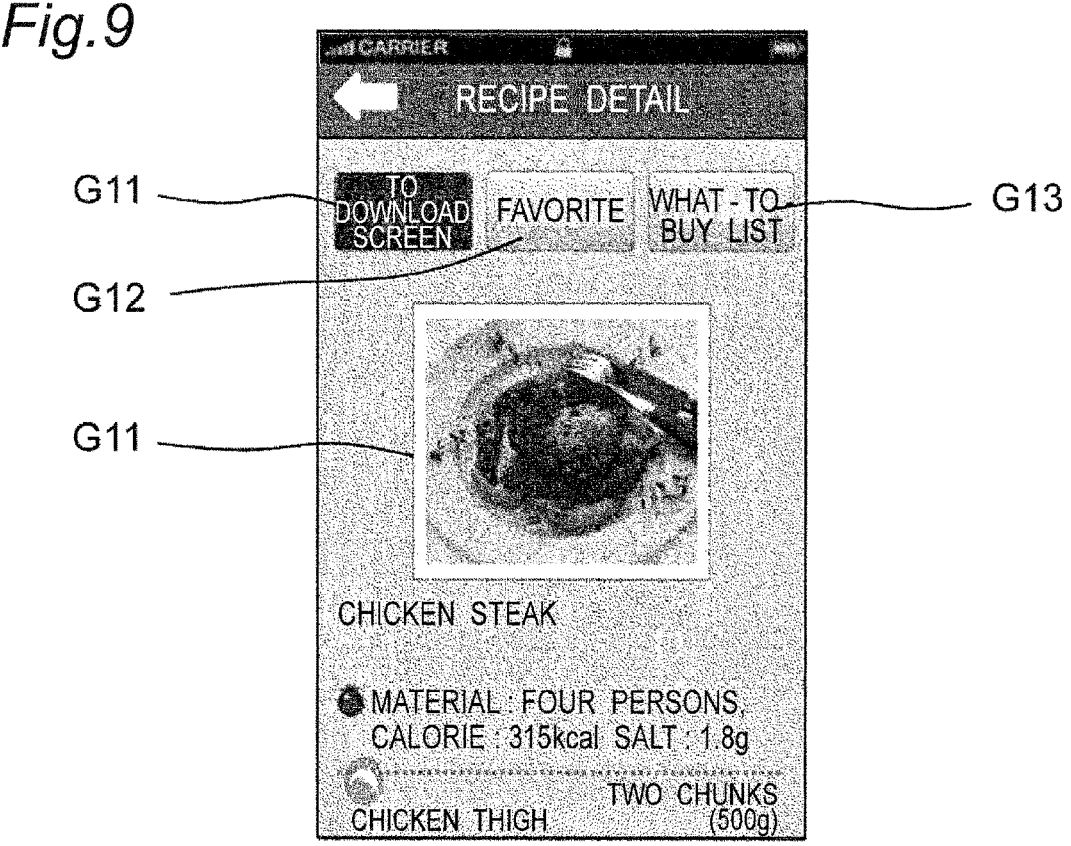
FIG. 9 is a view showing a smartphone screen which is displayed on a transition from one screen of the family message board with the recommended-cooking-menu display thereon shown in FIG. 8 to another screen of a recipe detail screen in a recipe site.

Operating the image G3 of the 'LINK' button in the recommended-cooking-menu screen shown in FIG. 8 causes a recipe detail screen of the recipe site shown in FIG. 9 to be displayed on the smartphone 300. This recipe site, managed by the management server 500, is viewable on the family message board provided by application software installed on the smartphone 300. Alternatively, the recipe site may be managed by another information providing server.

In FIG. 9, displayed in order from upper to lower side of the screen are characters of 'RECIPE DETAIL,' an image G11 of a 'TO DOWNLOAD SCREEN' button, an image G12 of a 'FAVORITE' button, an image G13 of a 'WHAT-TO-BUY LIST' button, a photo image G14 of a recommended cooking menu, a menu name, and a recipe.

Figure 10:
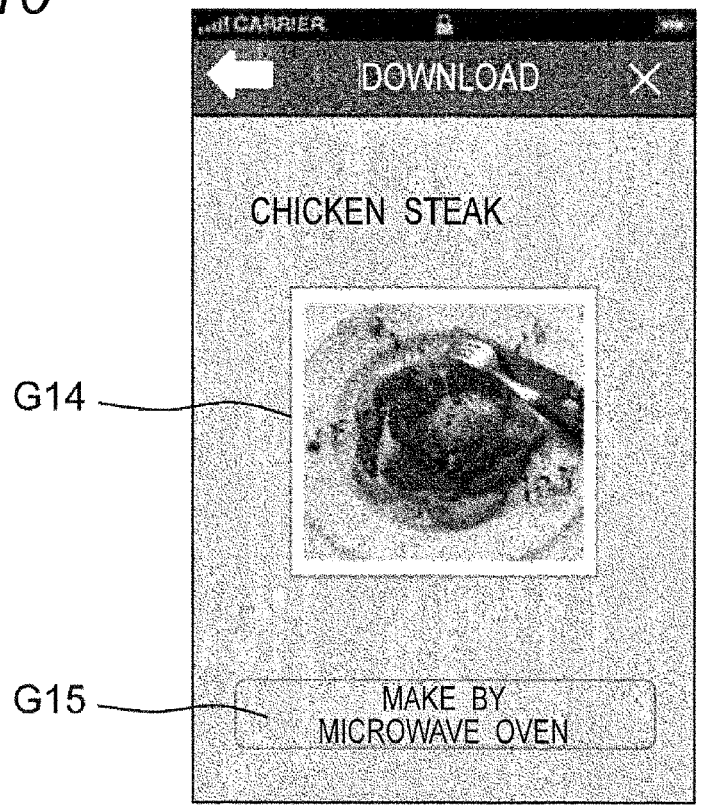
FIG. 10 is a view showing a smartphone screen which is displayed on a transition from the recipe detail screen shown in FIG. 9 to a download screen.

Then, operating the 'TO DOWNLOAD SCREEN' button in the recipe detail screen shown in FIG. 9 causes a download screen shown in FIG. 10 to be displayed on the smartphone 300. In FIG. 10, displayed in order from upper to lower side of the screen are characters of 'DOWNLOAD,' a menu name, a an photo image G14 of a recommended cooking menu, and an image G15 of a 'MAKE BY MICROWAVE OVEN' button.

In the case where 'recipe information' of the recommended cooking menu is not registered in the cooking device 100, operating the 'MAKE BY MICROWAVE OVEN' button in the screen of the smartphone 300 causes messages (shown in FIG. 11) posted from the cooking-menu proposing section 500b to be displayed on the smartphone 300.

Figure 11:
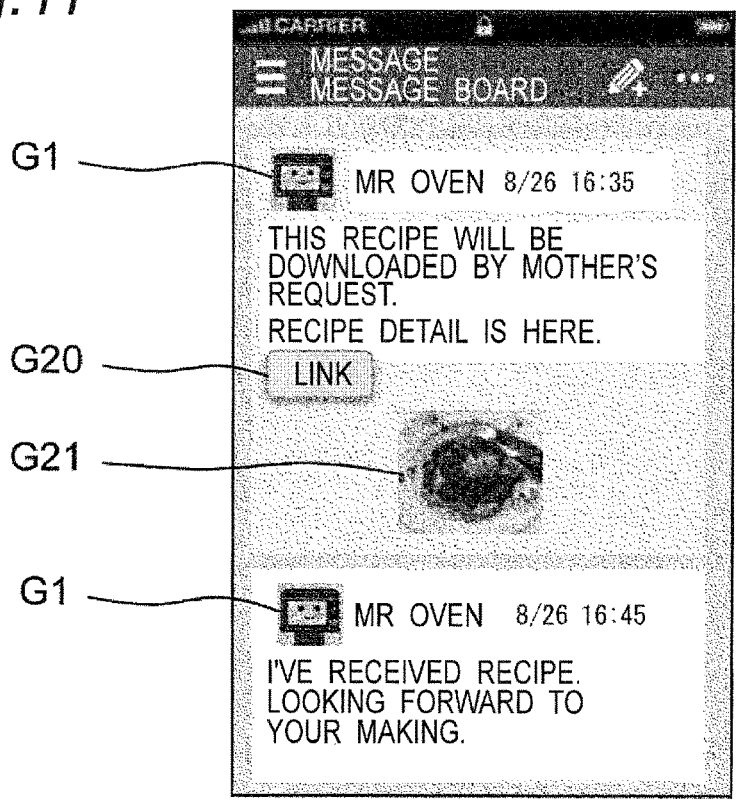
FIG. 11 is a view showing a smartphone screen which is displayed at a start of download in the download screen shown in FIG. 10.

FIG. 11 shows a screen of the smartphone 300 which is displayed at a start of download in the download screen shown in FIG. 10. In FIG. 11, displayed in order from upper to lower side of the screen are characters of 'MESSAGE' and 'MESSAGE BOARD,' the face image G1 of the personalized cooking device 100, characters of 'MR OVEN,' a posting time, characters of 'THIS RECIPE WILL BE DOWNLOADED BY MOTHER'S REQUEST,' characters of 'RECIPE DETAIL IS HERE,' an image G20 of the 'LINK' button, and a photo image G21 of the recommended cooking.

Next, the photo image of the recommended cooking menu, the menu name and 'recipe information' are downloaded from the management server 500. At an end of the download, a notification message indicative that the download of information relating to the recommended cooking menu from the cooking device 100 has been ended is posted to the family message board managed by the family-message-board server 400.

As a result of this, on the lower side of the screen shown in FIG. 11, the face image G1 of the personalized cooking device 100, the characters of 'MR OVEN,' a posting time, and characters of 'I'VE RECEIVED RECIPE. LOOKING FORWARD TO YOUR MAKING.' are displayed on the smartphone 300.

In addition, operating the image G20 of the 'LINK' button in the message board screen shown in FIG. 11 causes the screen to move to the recipe site shown in FIG. 9, where the recipe detail screen as to the recommended cooking menu is displayed on the smartphone 300.

Meanwhile, in the case where 'recipe information' as to the recommended cooking menu is registered in the cooking device 100, operating the image G15 'MAKE BY MICROWAVE OVEN' button in the screen of smartphone 300 causes messages (shown in FIG. 12) posted from the cooking-menu proposing section 500b to be displayed on the smartphone 300.

Figure 12:
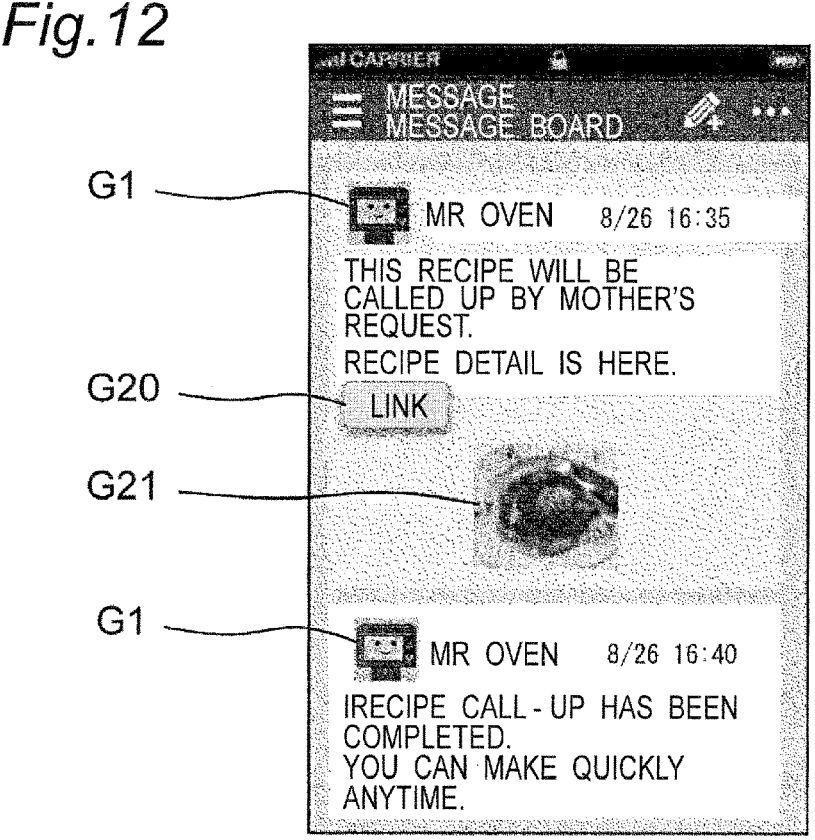
FIG. 12 is a view showing a smartphone screen which is displayed at a start of download in the download screen shown in FIG. 10.

FIG. 12 shows a screen of the smartphone 300 which is displayed at a start of download in the download screen shown in FIG. 10. In FIG. 12, displayed in order from upper to lower side of the screen are characters of 'MESSAGE' and 'MESSAGE BOARD,' the face image G1 of the personalized cooking device 100, characters of 'MR OVEN,' a posting time, characters of 'THIS RECIPE WILL BE CALLED UP BY MOTHER'S REQUEST,' characters of 'RECIPE DETAIL IS HERE,' an image G20 of the 'LINK' button, and the photo image G21 of the recommended cooking.

Next, the photo image and menu name of the recommended cooking menu is downloaded. At an end of the download, a notification message indicative that the download of information relating to the recommended cooking menu from the cooking device 100 has been ended is posted to the family message board managed by the family-message-board server 400.

As a result of this, on the lower side of the screen shown in FIG. 12, the face image G1 of the personalized cooking device 100, the characters of 'MR OVEN,' a posting time, and characters of 'RECIPE CALL-UP HAS BEEN COMPLETED. YOU CAN MAKE QUICKLY ANYTIME.' are displayed on the smartphone 300.

In FIG. 9, operating the image G12 of the 'FAVORITE' button causes the cooking menu selected from the recommended cooking menus to be registered in a favorite-cooking-menu storage section (not shown) of the management server 500. Past 30 favorite cooking menus including the latest registered menu are stored in the favorite-cooking-menu storage section.

Also in FIG. 9, operating the image G13 of the 'WHAT-TO-BUY LIST' button causes the screen of what-to-buy list registration to be displayed, where the what-to-buy list can be registered by checking the food material list necessary for the selected cooking menu for food materials that need to be bought. The what-to-buy list is registered in the management server 500.

Figure 13:
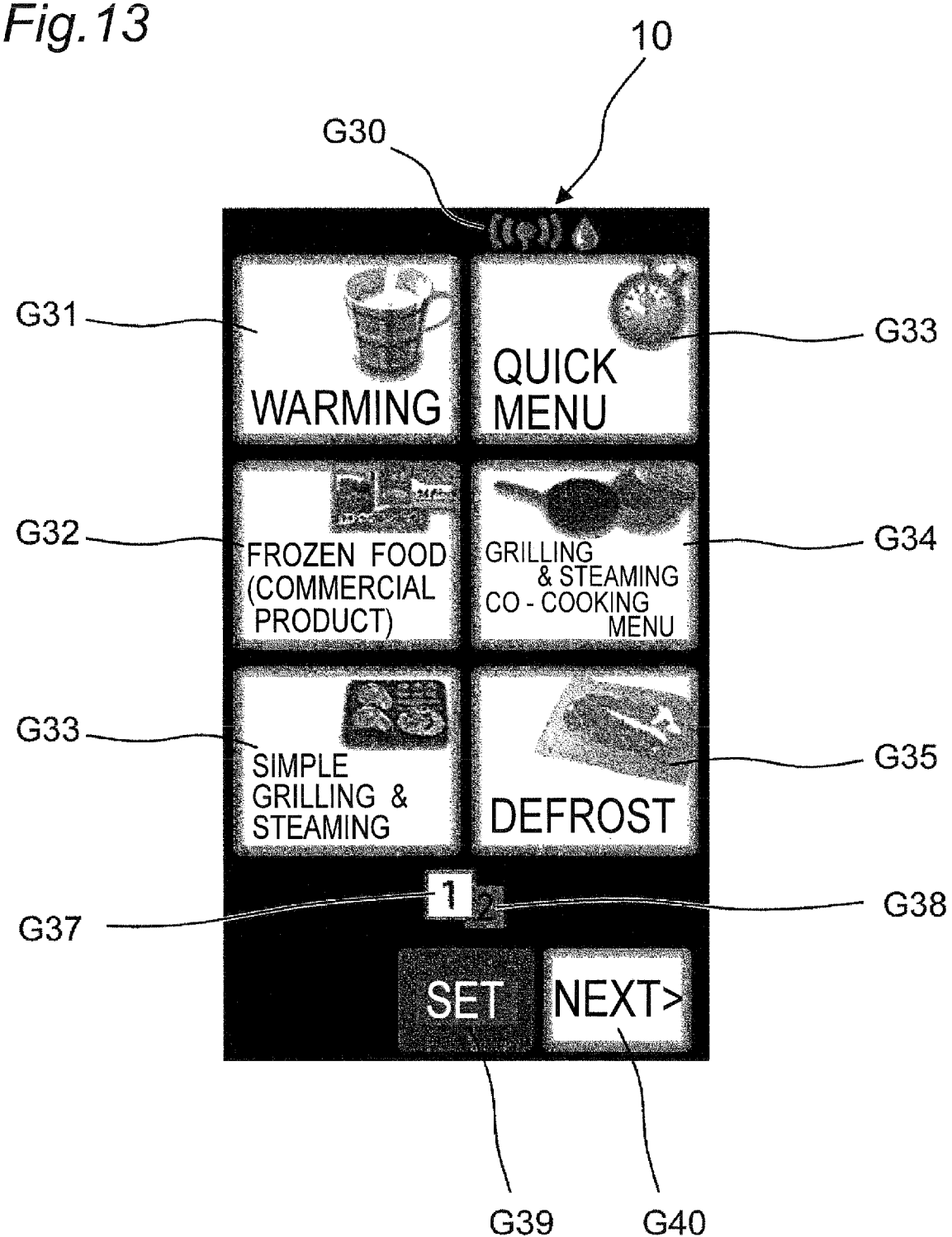
FIG. 13 is a view showing a first main screen displayed in a color LCD (Liquid Crystal Display) part of the cooking device.

FIG. 13 shows a first main screen displayed in the color LCD part 10 of the cooking device 100, where longitudinal 3 by lateral 2, totally six images are displayed. On the left column in this color LCD part 10, displayed in decreasing order from the upper side are an image G31 including characters of 'WARMING,' an image G32 including characters of 'FROZEN FOOD (COMMERCIAL PRODUCT),' and an image G33 including characters of 'SIMPLE GRILLING/STEAMING.' On the right column, displayed in decreasing order from the upper side are an image G34 including characters of 'QUICK MENU,' an image G35 including characters of 'GRILLING & STEAMING CO-COOKING MENU,' and an image G36 including characters of 'DEFROST.' On the lower side of the images G33, G36 of the first main screen in the color LCD part 10, an image G37 of '1' and an image G38 of '2' indicative which of the first main screen and a second main screen is displayed is displayed. Further, an image G39 of a 'SETTING' button and an image G40 of a 'NEXT>' button are displayed at the lower center side of the first main screen in the color LCD part 10. In addition, an antenna mark indicative of a wireless LAN communication-enabled state between the wireless communication module 120 and the wireless access point 200 is displayed at an uppermost portion of the color LCD part 10. Also, when the wireless LAN communication is disabled due to some reason, the antenna mark is supplied with a x mark added beside.

Displayed in the second main screen, although not shown, are an image including characters of 'COOKING SELECT,' an image including characters of 'HEALTHY FOOD SET,' an image including characters of 'MANUAL OVEN,' an image including characters of 'DOWNLOAD MENU,' an image including characters of 'INTRODUCTION MENU,' and an image including characters of 'BACTERIA ELIMINATION & MAINTENANCE.'

FIG. 13, in which the background of the image G37 of '1' is white-colored while the background of the image G38 of '2' is gray-colored, shows that the first main screen of the color LCD part 10 is displayed.

Figure 14:
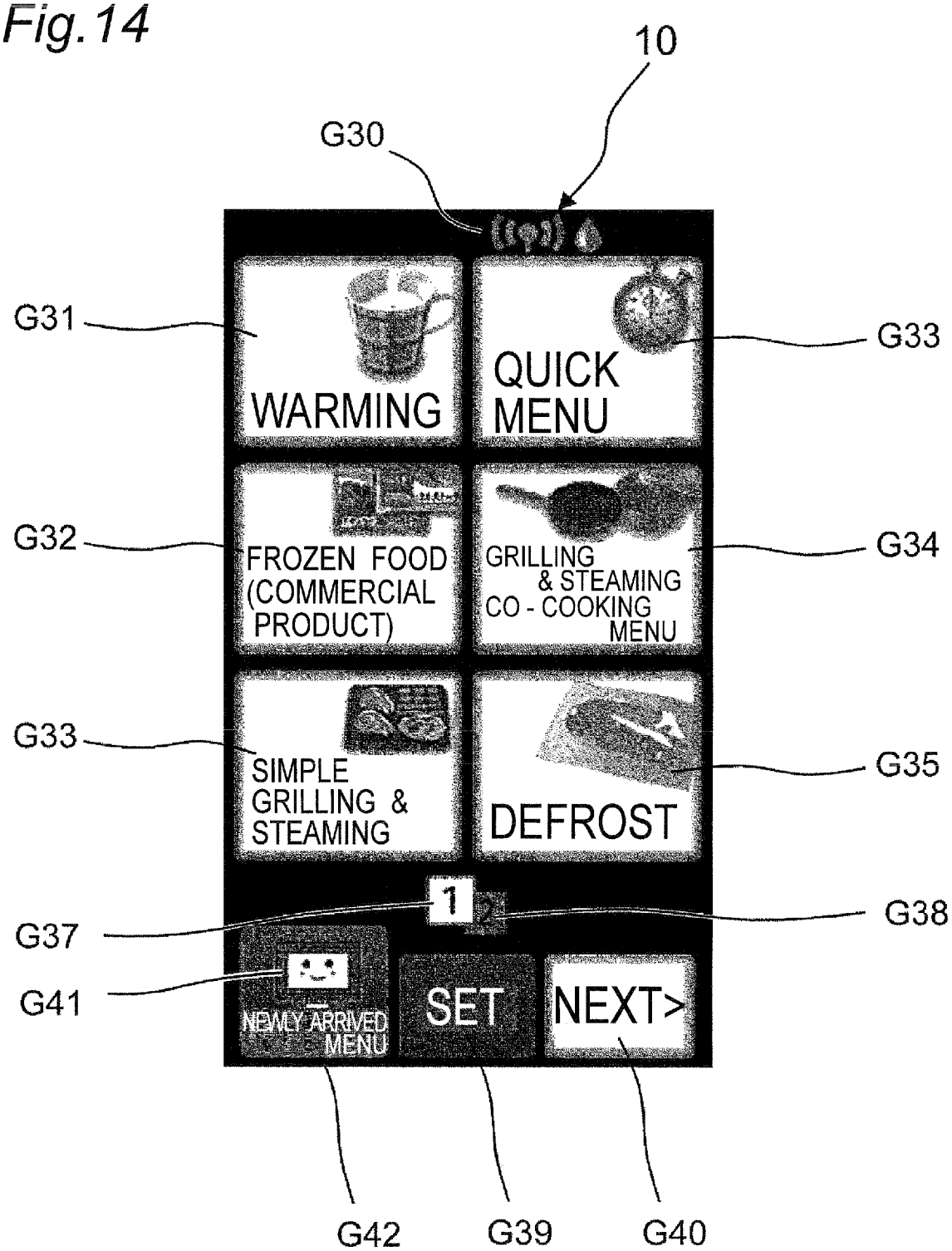
FIG. 14 is a view showing a first main screen of the cooking device displayed when a recipe of a cooking menu is downloaded from the recipe site.

In this state, when photo images of recommended cooking menus and menu names are downloaded from the recipe site managed by the management server 500 to the cooking device 100, a face image G41 of the personalized cooking device 100 as well as an image G42 of a 'NEWLY ARRIVED MENUS' button including characters of 'NEWLY ARRIVED MENUS' are displayed on the lower left side of the first main screen of the color LCD part 10 as shown in FIG. 14. In the screen, the background color of the face image G41 flickers red at constant intervals, notifying the user that the recommended cooking menus have been downloaded.

Figure 15:
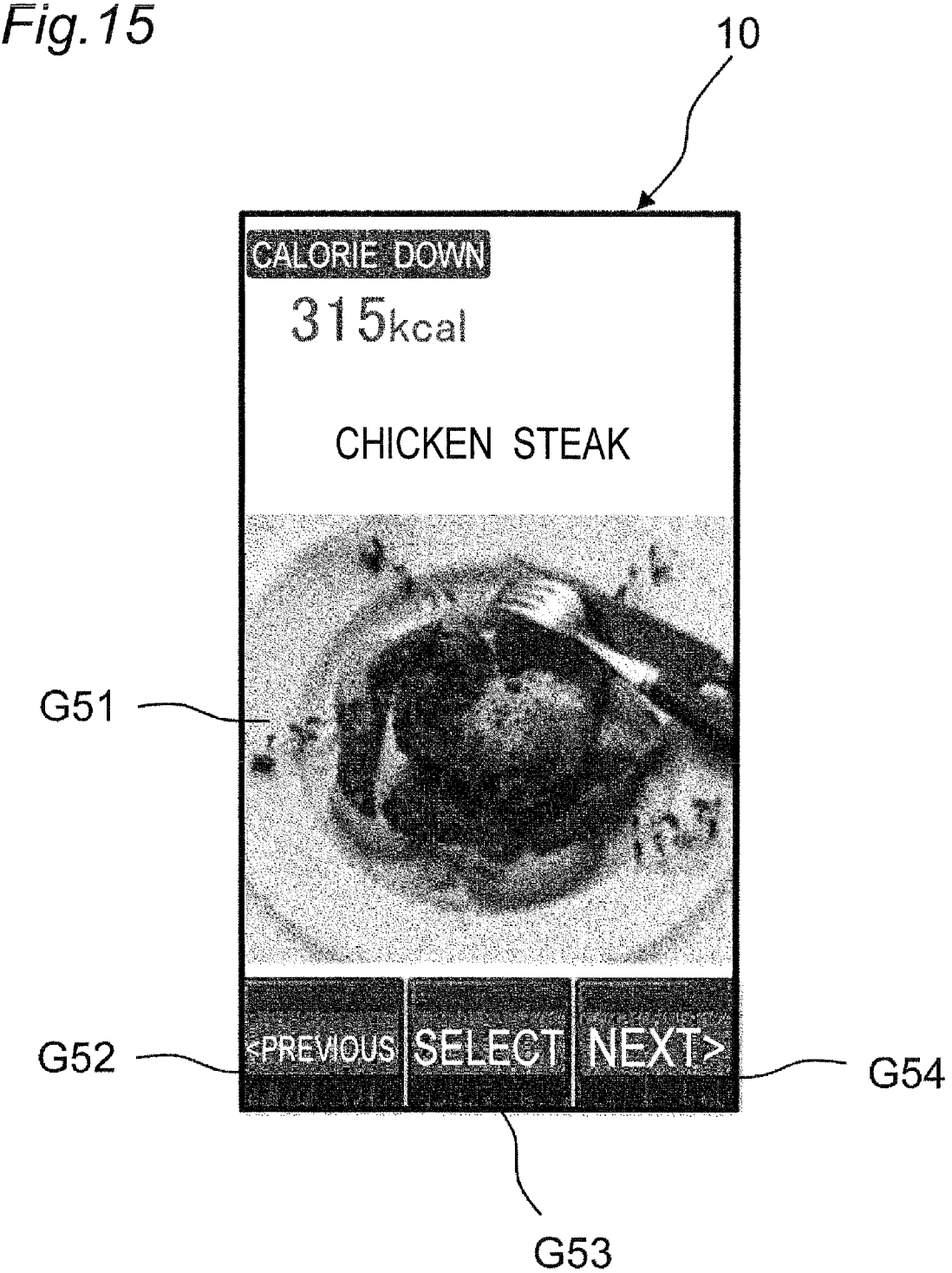
FIG. 15 is a view showing a screen of the cooking device displayed when the cooking menu downloaded from the recipe site is selected.

Next, operating the image G42 of the 'NEWLY ARRIVED MENUS' button displayed in the color LCD part 10 of the cooking device 100 causes a selection screen as to newly arrived recommended cooking menus downloaded from the recipe site to be displayed in the color LCD part 10 as shown in FIG. 15.

In FIG. 15, displayed in order from upper to lower side of the screen are characters of 'CALORIE DOWN,' characters of '315 kcal' as a calorie level of the menu, characters of 'CHICKEN STEAK' as the menu name, a photo image G51 of cooking, an image G52 of a '<PREVIOUS' button located on the lower left side, an image G53 of a 'SELECT' button located at the lower center, and an image G54 of a 'NEXT' button located on the lower right side.

In this case, operating the image G53 of the 'SELECT' button displayed in the color LCD part 10 of the cooking device 100 causes a transition to a start screen for the cooking of 'CHICKEN STEAK.' Meanwhile, operating the image G52 of the '<PREVIOUS' button or the image G54 of the 'NEXT>' button causes a registered recommended cooking menu other than the 'CHICKEN STEAK' to be displayed in the color LCD part 10. The cooking device 100 has stored both 'recipe information' about recommended cooking menus registered in the cooking device 100 and 'recipe information' about recommended cooking menus downloaded to the cooking device 100, allowing the user to select from among a plurality of recommended cooking menus stored in the cooking device 100.

With regard to such a downloaded recommended cooking menu as shown in FIG. 15, operating the image of the 'DOWNLOAD MENU' button in the second main screen (not shown) of the color LCD part 10 of FIG. 13 in the cooking device 100 causes one of a plurality of downloaded recommended cooking menus as shown in FIG. 15 to be displayed, where other recommended cooking menus are selectable by the '<PREVIOUS' button or the 'NEXT>' button. Up to 15 past recommended cooking menus including the latest downloaded recommended cooking menu are registered in the cooking device 100.

FIG. 16 shows a screen of the smartphone 300 in which a seal as an example of cooking-device-status notice posted from the cooking device 100 is displayed on the family message board. Displayed in FIG. 16 are the face image G1 of the personalized cooking device 100, characters of 'MR OVEN,' a posting time, an image G50 in which the cooking device 100 holds cooking utensils on his two hands, and characters of 'COOKING UNDERWAY.'

An inquiry message from the smartphone 300 to the cooking device 100 is posted to the family message board managed by the family-message-board server 400. Then, according to the inquiry message posted to the family-message-board server 400, a response message from the cooking device 100 is posted to the family message board. In this case, depending on the content of the inquiry message, the management server 500 as an agency of the cooking device 100 posts the response message to the family message board.

Figure 17:
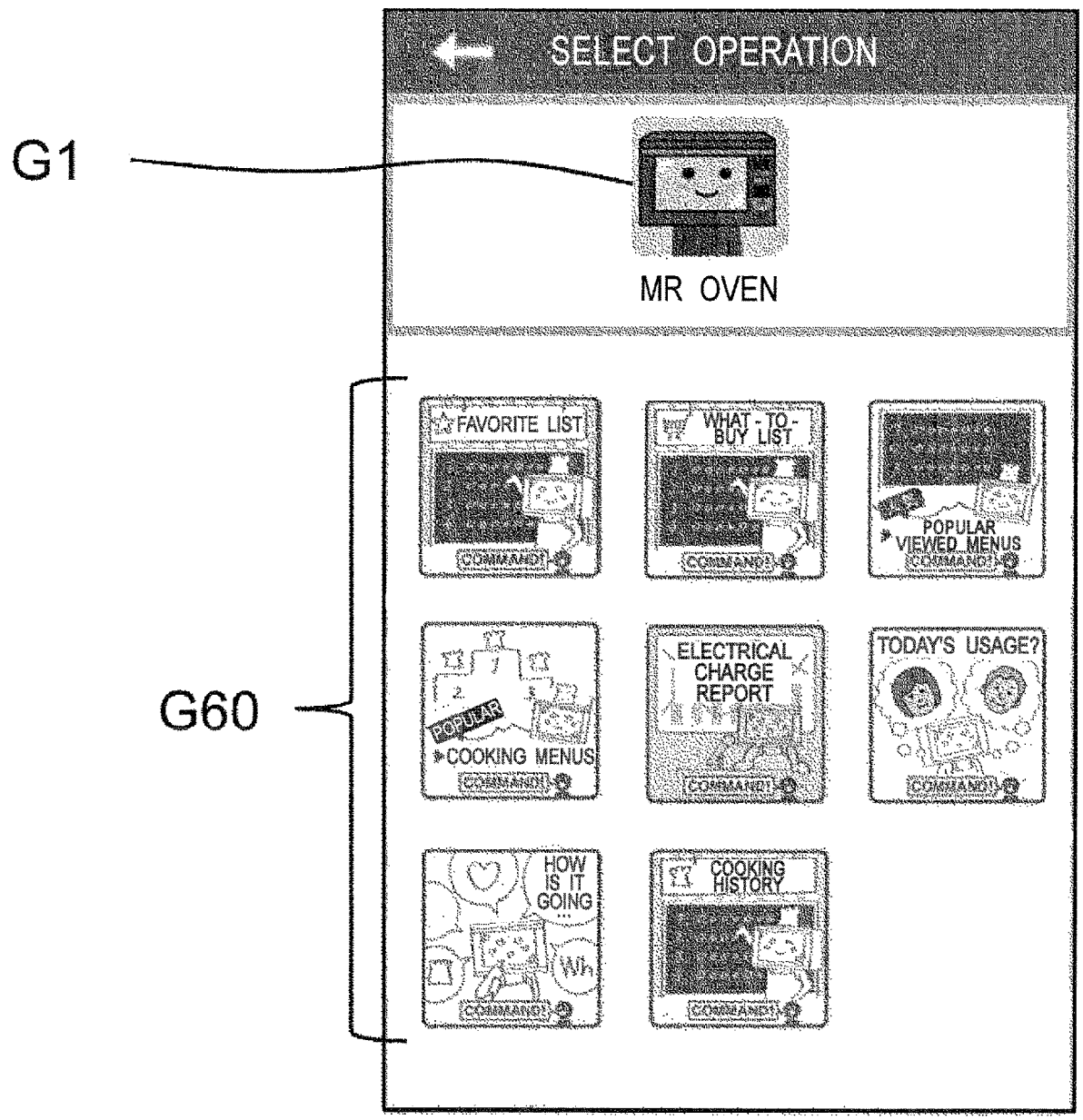
FIG. 17 is a view showing a smartphone screen in which a list of seals to be inquired from the cooking device is displayed on the family message board.

FIG. 17 shows a screen of the smartphone 300 in which a list of seals to be inquired from the cooking device is displayed on the family message board. Displayed in FIG. 17 are characters of 'SELECT OPERATION,' the face image G1 of the personalized cooking device 100, and an image G60 of a plurality of seals.

By selecting one seal from the image G60 of a plurality of seals and then transmitting, i.e. posting the family message board, the selection as an image of a new message, a response message responsive to the seal is posted from the management server 500 or the cooking device 100 to the family message board.

In this connection, the plurality of seals are exemplified as follows.

'FAVORITE LIST DISPLAY': displays favorite cooking menus registered in the favorite-cooking-menu storage section (not shown) of the management server 500;

'WHAT-TO-BUY LIST DISPLAY': displays a what-to-buy list registered in the management server 500;

'LET ME KNOW POPULAR VIEWED MENUS': displays a list of highly popular cooking menus viewed in the recipe site from a plurality of family message boards;

'LET ME KNOW POPULAR COOKING MENUS': displays a list of highly popular cooking menus downloaded in the recipe site from a plurality of family message boards;

'LET ME KNOW ELECTRICAL CHARGES': displays a list of month- or day-base electrical charges based on electricity consumption quantity of the cooking device 100;

'TODAY'S USAGE?': displays an all-day cooking history of today of the cooking device 100;

'LET ME KNOW status': displays a current status (cooking, standby, in-error, etc.) of the cooking device 100;

'LET ME KNOW COOKING MENU HISTORY': displays a cooking history of the cooking device 100; and so on.

Seals for inquiry from the cooking device 100 are not limited to those shown in FIG. 17 and may be ones for other inquiry use. Moreover, seals for commanding control over the cooking device 100 are also available; for example, an audio message along with a 'MESSAGE' seal or the like may be posted to the family message board. In this case, when a message is posted to the family message board, the message is downloaded to the cooking device 100 via the management server 500, and the user is notified, by means of a display or audio output, of the presence of a message in the cooking device 100. By the user's operating the cooking device 100, the message is reproduced by the loudspeaker 20 (shown in FIG. 3).

Figure 18:
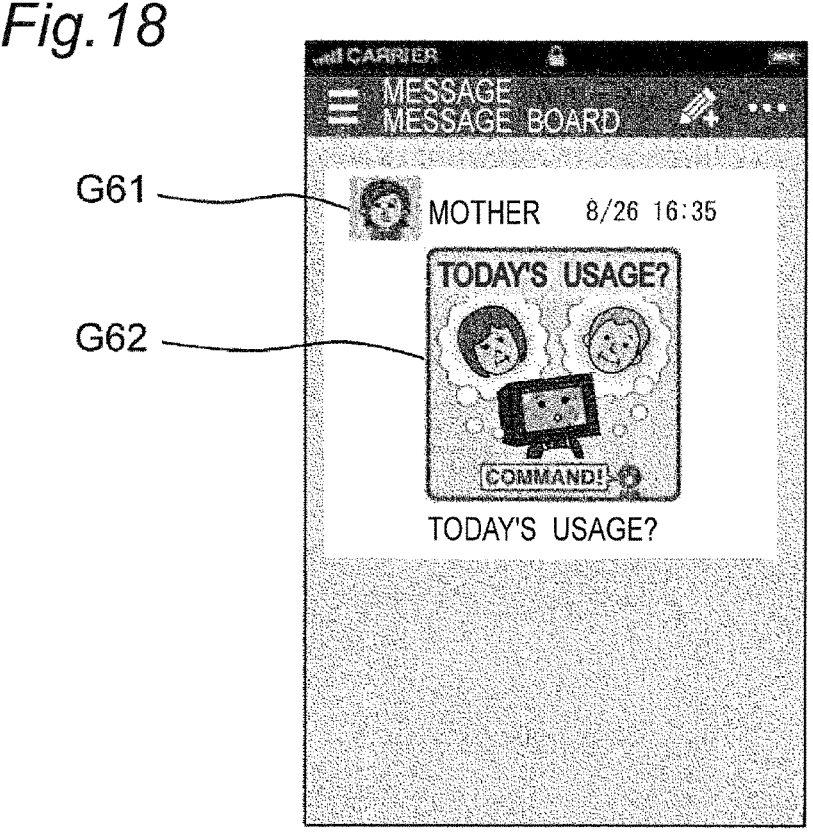
FIG. 18 is a view showing a smartphone screen in which an example of a seal for inquiring a one-day cooking history from the cooking device is displayed on the family message board.

FIG. 18 shows a screen of the smartphone 300 in which an example of a seal for inquiring a one-day cooking history from the cooking device 100 is displayed on the family message board. Displayed in FIG. 18 are a face image G61 of Mother, characters of 'MOTHER,' a posting time, an image G62 including characters of 'TODAY'S USAGE?' and characters of 'TODAY'S USAGE?.'

In response to the seal and message ('TODAY'S USAGE?') posted to the family-message-board server 400, the management server 500 posts a daily cooking history of today as a message from the cooking device 100 to the family message board based on the cooking history stored in the history storage section 500a.

As a result of this, the daily cooking history of today can be viewed in the family message board of the smartphone 300.

For example, it is possible for children to know an aspect of their aged parents by remotely confirming daily cooking history of today with respect to the cooking device 100 of the parents' house (observation use). In this case, a child user is enabled to view the recipe site from on the family message board by the smartphone 300, select cooking menus to be recommended to the parents, and download 'recipe information' of the recommended cooking menus to the cooking device 100 of the parents' house.

Figure 19:
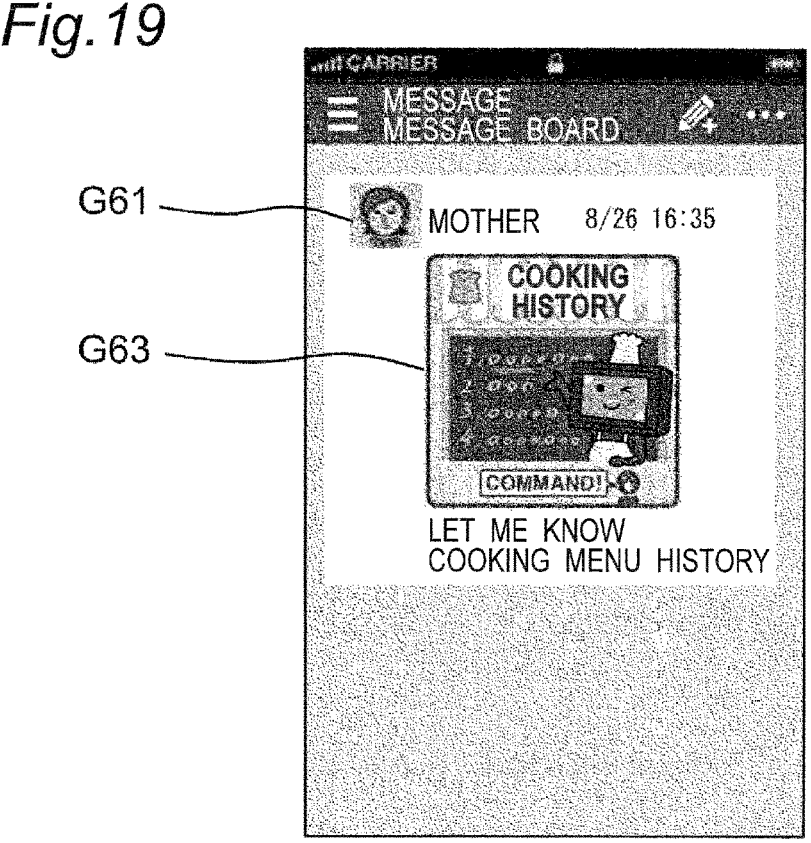
FIG. 19 is a view showing a smartphone screen in which a seal for inquiring a cooking history from the cooking device is displayed on the family message board.

FIG. 19 shows a screen of the smartphone 300 in which a seal for inquiring a cooking history from the cooking device 100 is displayed on the family message board. Displayed in FIG. 19 are the face image G61 of Mother, characters of 'MOTHER,' a posting time, an image G63 including characters of 'COOKING HISTORY,' and characters of 'LET ME KNOW COOKING MENU HISTORY.'

In response to the seal and message ('LET ME KNOW COOKING MENU HISTORY') posted to the family-message-board server 400, the management server 500 posts the cooking history stored in the history storage section 500a as a message from the cooking device 100 to the family message board.

As a result, it is possible to view the cooking history of the cooking device 100 in the family message board of the smartphone 300.

Figure 20:
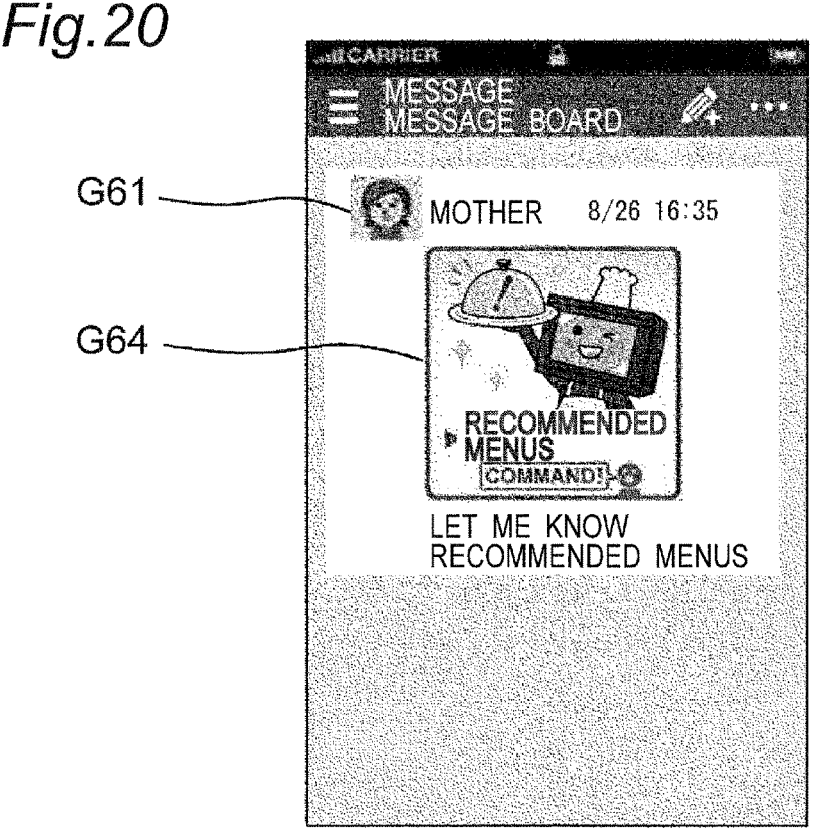
FIG. 20 is a view showing a smartphone screen in which a seal for inquiring recommended menus from the cooking device is displayed on the family message board.

FIG. 20 shows a screen of the smartphone 300 in which a seal for inquiring recommended menus from the cooking device 100 is displayed on the family message board. Displayed in FIG. 20 are the face image G61 of Mother, characters of 'MOTHER,' a posting time, an image G64 including characters of 'RECOMMENDED MENUS,' and characters of 'LET ME KNOW RECOMMENDED MENUS.'

In response to the seal and message ('LET ME KNOW RECOMMENDED MENUS') posted to the family-message-board server 400, the management server 500 posts a list of recommended cooking menus proposed by the cooking-menu proposing section 500b as a message from the cooking device 100 to the family message board.

As a result, it is possible to view the list of recommended cooking menus in the family message board of the smartphone 300.

Figure 21:
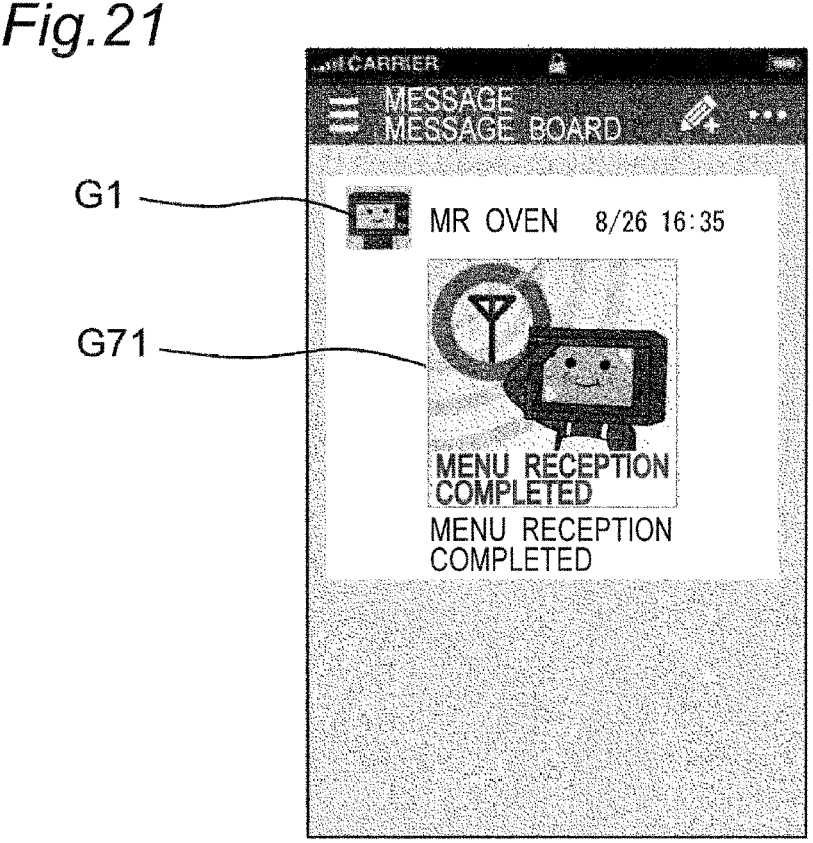
FIG. 21 is a view showing a smartphone screen in which a seal indicative that a recipe of a cooking menu from the recipe site has been completely downloaded to the cooking device is displayed on the family message board.

In FIGS. 11 and 12, the completion of download reception of 'recipe information' as to cooking menus from the recipe site to the cooking device 100 is posted to the family message board by way of a character message. However, without being limited to this, a seal indicative of the completion of download reception of 'recipe information' of cooking menus from the recipe site to the cooking device 100 may be posted to the family message board as shown in FIG. 21. Displayed in FIG. 21 are the face image G1 of the personalized cooking device 100, characters of 'MR OVEN,' a posting time, an image G71 of the cooking device 100 including characters of 'MENU RECEPTION COMPLETED,' and characters of 'MENU RECEPTION COMPLETED.'

As to posting to the family message board of the cooking device 100, not only such messages as described above but also 'error information' on the cooking device 100 and the like are posted to the family message board.

Figure 22:
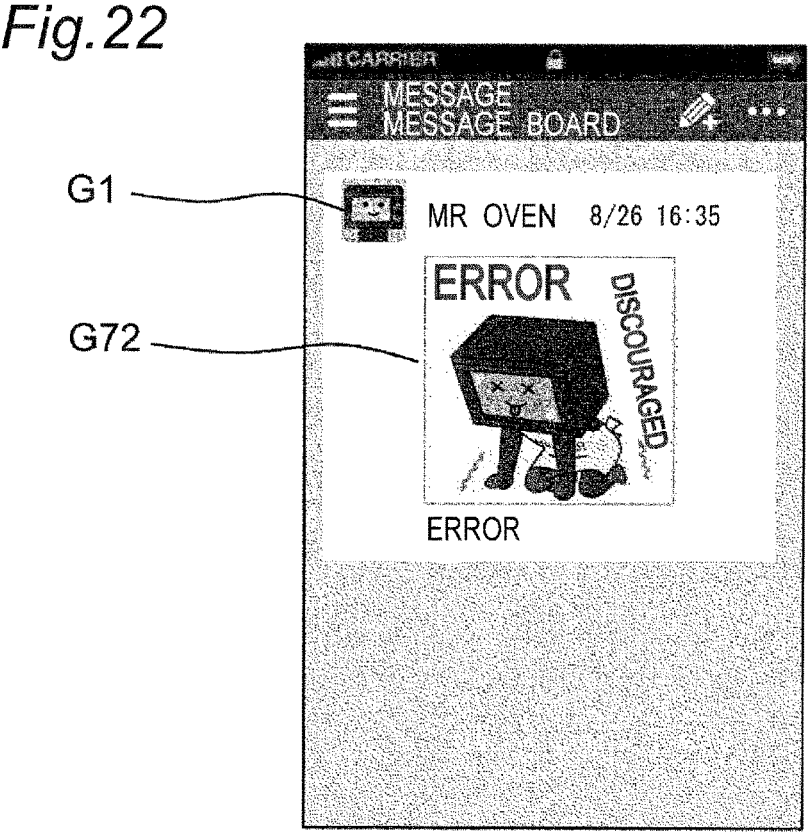
FIG. 22 is a view showing a smartphone screen in which an example of a seal as to error information posted from the cooking device is displayed on the family message board.

FIG. 22 shows a screen of the smartphone 300 in which an example of a seal as to 'error information' posted from the cooking device 100 is displayed on the family message board. Displayed in FIG. 22 are the face image G1 of the personalized cooking device 100, characters of 'MR OVEN,' a posting time, an image G72 including characters of 'ERROR' with the cooking device 100 trembling, and characters of 'ERROR.'

In this case, the cooking device 100 is out of normal operation due to some failure.

Figure 23:
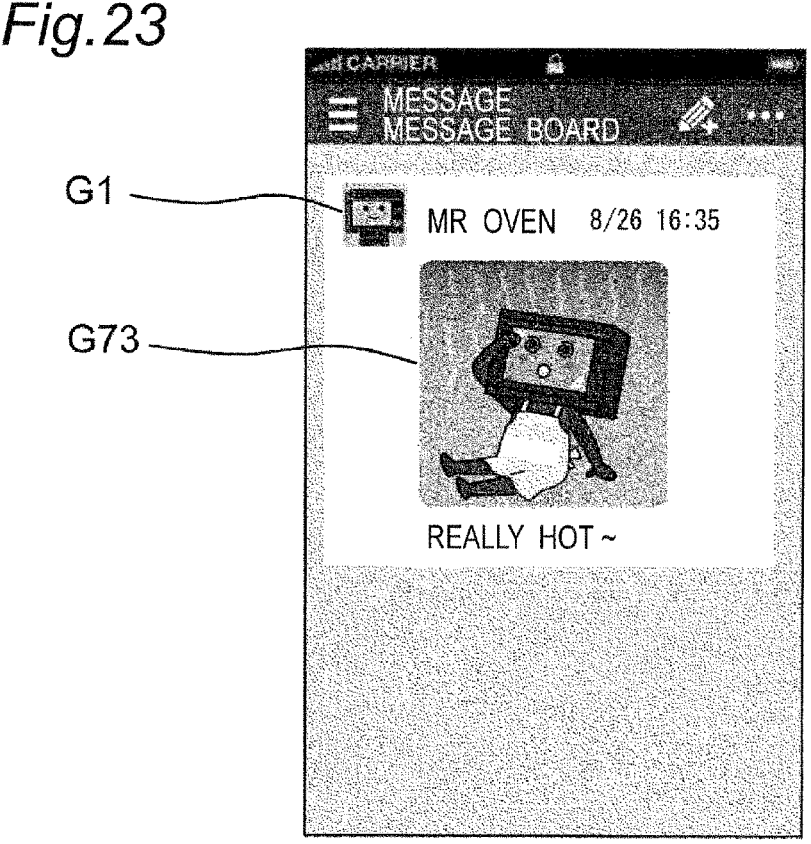
FIG. 23 is a view showing a smartphone screen in which an example of a seal as to error information (high temperature abnormality) posted from the cooking device is displayed on the family message board.

FIG. 23 shows a screen of the smartphone 300 in which an example of a seal as to error information (high temperature abnormality) posted from the cooking device 100 is displayed on the family message board. Displayed in FIG. 23 are the face image G1 of the personalized cooking device 100, characters of 'MR OVEN,' a posting time, an image G73 with the personalized cooking device 100 dazed by hotness, and characters of 'REALLY HOT~.'

In this case, the cooking device 100 is in such a state that inside of the heating chamber 2 or inside of the main casing 1 has come to high temperature for some reason.

In addition, 'maintenance information' as to cleaning of the of the heating chamber 2 or the like may be posted from the cooking device 100 to the family message board so as to prompt the user to perform maintenance work.

According to the heating cooking system having the above-described constitution, 'information relating to executed cooking menus' executed in the cooking device 100 or 'information relating to status of the cooking device itself' is posted from the executed-cooking-menu posting section 110a, the cooking-end posting section 110b, the extraction-information posting section 110c and the cooking-device-status posting section 110d of the cooking device 100 to the family-message-board server 400 (communication tool manager) via the Internet network N. As a result of this, even without any control request from a smartphone 300 (information terminal), unique-to-cooking information can be notified to each user's smartphone 300 from the cooking device 100 by using the family message board (communication tool) of the family-message-board server 400, hence a greatly improved convenience.

Since 'cooking-end information' indicative that the cooking of the cooking menu has been ended is notified to the user's smartphone 300 (information terminal) from the cooking device 100 by using the family message board, the user, even if far distant from the cooking device 100, can be informed of a cooking end with the cooking device 100 by means of the smartphone 300.

Since 'fail-to-extract information' indicative that the cooking object has not been extracted from inside of the heating chamber even after a preset time elapse since a cooking end of the cooking menu is notified to the user's smartphone 300 (information terminal), the user can be aware of an extraction failure by the smartphone 300 even if the user, being distant from the cooking device 100, has failed to extract the cooking object.

Since 'cooking information' relating to the cooking device status during a course of cooking for the cooking menu is notified to the user's smartphone 300 (information terminal) from the cooking device 100 by using the family message board (communication tool), the user can be aware of a cooking device status during a course of cooking even if the user is far from the cooking device 100.

Histories relating to users' dietary lives are stored in the history storage section 500a of the management server 500, and based on those histories, recommended cooking menus are proposed by the cooking-menu proposing section 500b of the management server 500. Then, information relating to a cooking menu proposal proposed by the cooking-menu proposing section 500b is posted to the family message board of the family-message-board server 400 (communication tool manager) by the cooking-menu posting section 500c. As a result of this, optimum cooking menus for the user can be proposed to the user through the smartphone 300 (information terminal). Consequently, for example, unbalanced diet can be prevented by proposing nutritionally well-balanced cooking menus or the like, making it possible to realize a healthy dietary life.

Since cooking histories of the cooking device 100 based on 'information relating to executed cooking menus' or 'information relating to status of the cooking device itself' posted from the cooking device 100 are stored in the history storage section 500a of the management server 500, it is implementable to propose optimum recommended cooking menus based on the cooking histories of the cooking device 100.

Users' meal histories based on 'information relating to users' meal menus' posted from the smartphone 300 (information terminal) are stored in the history storage section 500a of the management server 500. In this connection, users' meal menus refer to menus which have never been cooked with the cooking device 100 and which include dining-out menus and the like. As a result of this, in the case where cooking menus with use of the cooking device 100 occupy a relatively low ratio, proposing recommended cooking menus based on information relating to meal menus that have not yet been cooked with the cooking device 100 makes it possible to propose optimum cooking menus.

When recommended cooking menus are proposed based on both the cooking histories of the cooking device 100 and meal menus of the user, even more optimum cooking menus can be proposed.

Second Embodiment

A heating cooking system according to a second embodiment of the invention is similar in constitution to the heating cooking system of the first embodiment except for the proposal of recommended cooking menus by the management server 500.

In the heating cooking system of the second embodiment, the cooking-menu proposing section 500b of the management server 500 proposes recommended cooking menus based on cooking histories and meal histories stored in the history storage section 500a, as well as on 'information relating to weather, calendar, season, festival, seasonal food materials, and popular menus' derived from other information providing servers (not shown). In this connection, at least information relating to weather is obtained by acquiring, from an information providing server, weather information on a region where the cooking device 100 is installed.

Consequently, according to the heating cooking system, it is made possible to propose recommended cooking menus responsive to weather, calendar, season, and festival can be proposed, and moreover to propose recommended cooking menus with use of seasonal food materials.

Third Embodiment

A heating cooking system according to a third embodiment of the invention is similar in constitution to the heating cooking system of the first embodiment except for the proposal of recommended cooking menus by the management server 500.

In the heating cooking system of the third embodiment, the cooking-menu proposing section 500b of the management server 500 proposes recommended cooking menus based on cooking histories and meal histories stored in the history storage section 500a, as well as on 'schedule information' as to users stored in a calender manager of the family-message-board server 400.

For example, a schedule registered in a calender (application software) of the smartphone of the user who uses the cooking device most frequently among a plurality of users is used as the users' 'schedule information.' The 'schedule information' in the calender of the user's smartphone is so set as to be automatically stored in a calender manager of the family-message-board server 400. In addition, 'schedule information' registered in individual calenders of smartphones of a plurality of users constituting a group that uses the family message board may be gathered and automatically stored in the calender manager (not shown) of the family-message-board server 400. In this case, it is also possible that with priority levels given to the individual users, 'schedule information' with higher priority levels are to be stored.

Also, without using the schedule registered in the calender of the user, a separate calender may be provided on the application for activating the family message board and schedules inputted therein may be used as the user's 'schedule information.'

As a result of this, according to the heating cooking system, the cooking-menu proposing section 500b of the management server 500 is enabled to propose recommended cooking menus responsive to users' schedules (e.g., birthday, anniversary, school events, etc.).

Furthermore, in combination of the second and third embodiments, the cooking-menu proposing section 500b of the management server 500 may propose recommended cooking menus based on cooking histories and meal histories stored in the history storage section 500a, 'information relating to weather, calendar, season, festival, seasonal food materials, and popular menus' derived from other information providing servers (not shown), and users' 'schedule information' stored in the calender manager of the family-message-board server 400.

In this connection, any arbitrary character strings are inputted for schedules registered in the calender of the smartphone. Therefore, specific keywords (e.g., birthday, anniversary, school events, etc.) among 'schedule information' inputted into the calender are extracted, and extracted users' schedule information is stored in the calender manager (not shown) of the management server 500.

In the first to third embodiments, the smartphone 300 is used as the information terminal. However, without limitation to this, the information terminal may be a PDA (Personal Digital Assistant) or a mobile PC (Personal Computer) or the like.

Although specific embodiments of the present invention have been described hereinabove, yet the invention is not limited to the above first to third embodiments and may be carried out as they are changed and modified in various ways within the scope of the invention.

The invention and embodiments can be summarized as follows.

A heating cooking system of the present invention comprises:
a cooking device 100;
servers 400, 500 for communicating with the cooking device 100 via a communication network; and
an information terminal 300 for communicating with the servers 400, 500 via the communication network, wherein
the servers 400, 500 include
a communication tool manager 400 for managing communication tools of the information terminal 300 for users, and
the cooking device 100 includes
posting sections 110a, 110b, 110c, 110d for posting information relating to executed cooking menus to the communication tool manager 400 of the servers 400, 500 via the communication network.

In this connection, the term, communication tool, refers to bulletin board systems including electronic message boards, mailing lists, or the like.

With this constitution, information relating to cooking menus executed with the cooking device 100 is posted from the posting sections 110a, 110b, 110c, 110d of the cooking device 100 to the communication tool manager 400 of the servers 400, 500 via the communication network. As a result of this, even without any control request from the information terminal 300, unique-to-cooking information can be notified to each user's information terminal 300 from the cooking device 100 by using the communication tool, hence a greatly improved convenience.

In the heating cooking system of one embodiment,
the information relating to executed cooking menus includes information indicative that cooking of the cooking menu has been ended.

According to this embodiment, information indicative that cooking of a cooking menu has been ended is notified to the user's information terminal 300 from the cooking device 100 by using the communication tool. Therefore, the user, even if distant from the cooking device 100, can be informed of a cooking end with the cooking device 100 by means of the information terminal 300.

In the heating cooking system of one embodiment,
the information relating to executed cooking menus includes fail-to-extract information indicative that a cooking object has not been extracted from inside of a heating chamber of the cooking device 100 even after a preset time elapse since a cooking end of the cooking menu.

According to this embodiment, since fail-to-extract information indicative that the cooking object has not been extracted from inside of the heating chamber 2 of the cooking device 100 even after a preset time elapse since a cooking end of the cooking menu is notified to the user's information terminal 300 by using the communication tool, the user can be aware of an extraction failure by the information terminal 300 even if the user, being distant from the cooking device 100, has failed to extract the cooking object.

In the heating cooking system of one embodiment,
the information relating to executed cooking menus includes information relating to cooking device status of the cooking device 100 during a course of cooking for the cooking menu.

According to this embodiment, since information relating to the cooking device status of the cooking device 100 during a course of cooking for the cooking menu is notified to the user's information terminal 300 from the cooking device 100 by using the communication tool, the user, even if located distant from the cooking device 100, can be aware of the cooking device status during the cooking.

In the heating cooking system of one embodiment,
the server 500 comprises:
a history storage section 500a for storing histories relating to users' dietary lives;
a cooking-menu proposing section 500b for proposing recommended cooking menus based on the histories stored in the history storage section 500a; and
a cooking-menu posting section 500c for posting information relating to a recommended cooking menu proposal proposed by the cooking-menu proposing section 500b to the communication tool manager.

According to this embodiment, histories relating to users' dietary lives are stored in the history storage section 500a of the server 500, and based on those histories, recommended cooking menus are proposed by the cooking-menu proposing section 500b of the server 500. Then, information relating to a cooking menu proposal proposed by the cooking-menu proposing section 500b is posted to the communication tool manager 400 by the cooking-menu posting section 500c. As a result of this, optimum cooking menus based on the user's past dietary-life status can be proposed to the user through the information terminal 300. Consequently, for example, unbalanced diet can be prevented by nutritionally well-balanced cooking menus or the like, making it possible to realize a healthy dietary life.

In the heating cooking system of one embodiment,
the histories relating to users' dietary lives stored in the history storage section 500a of the server 500 include cooking histories of the cooking device 100 based on the information relating to executed cooking menus posted from the cooking device 100.

According to this embodiment, since cooking histories of the cooking device 100 based on information relating to executed cooking menus posted from the cooking device 100 are stored in the history storage section 500a of the server 500, the cooking-menu proposing section 500b is enabled to propose optimum recommended cooking menus based on the cooking histories of the cooking device 100.

In the heating cooking system of one embodiment,
the information terminal 300 further comprises
a meal-menu posting section for posting information relating to users' meal menus to the communication tool manager 400 of the servers 400, 500 via the communication network, wherein
the histories relating to users' dietary lives stored in the history storage section 500a of the server 500 include the users' meal histories based on the information relating to the users' meal menus posted from the meal-menu posting section of the information terminal 300.

According to this embodiment, users' meal histories based on the information relating to users' meal menus posted from the meal-menu posting section of the information terminal 300 are stored in the history storage section 500a of the server 400, 500. In this connection, users' meal menus refer to menus which have never been cooked with the cooking device 100 and which include dining-out menus and the like. As a result of this, in the case where cooking menus with use of the cooking device 100 occupy a relatively low ratio, the cooking-menu proposing section 500b can propose optimum recommended cooking menus based on information relating to meal menus that have not yet been cooked with the cooking device 100.

Also, the cooking-menu proposing section 500b can propose even more optimum cooking menus based on both the cooking histories of the cooking device 100 and users' meal menus.

REFERENCE SIGNS LIST 1 main casing
2 heating chamber
3 door
5 exhaust duct
6 dew receiving container
7 outer glass
8 handle
9 operation panel
10 color LCD part
12 cancel key
13 start key
20 loudspeaker
30 heater
40 magnetron
50 door sensor
100 cooking device
110 control unit
110a executed-cooking-menu posting section
110b cooking-end posting section
110c extraction-information posting section
110d cooking-device-status posting section
120 wireless communication module
200 wireless access point
300 smartphone
400 family-message-board server
500 management server
500a history storage section
500b cooking-menu proposing section
500c cooking-menu posting section
500d recipe-information storage section
500e communication section

The invention claimed is:
1. A heating cooking system comprising:
a cooking device;
servers for communicating with the cooking device via a communication network; and
multiple information terminals for communicating with the servers via the communication network, wherein
the servers include:
a communication tool manager for managing communication tools of the multiple information terminals and the cooking device to enable communication among multiple users of the multiple information terminals and the cooking device, and
a cooking-menu proposing section for proposing recommended cooking menus,
the multiple users and the cooking device are members of a group registered in the servers,
the communication tools are configured to display screens for communication among the members of the group on the multiple information terminals,
the communication tool manager is configured to enable the recommended cooking menus proposed from the cooking-menu proposing section to the communication tools to be downloaded from the servers to the cooking device by operating any of the multiple information terminals, and
in response to an instruction entered in one of the screens displayed on any of the multiple information terminals by one of the multiple users to download the recom- mended cooking menus from the servers to the cooking device, the communication tool manager is configured to cause the communication tools to display, on the screens displayed on the multiple information terminals, information indicating which of the multiple users input the instruction to download the recommended cooking menus.

2. The heating cooking system as claimed in claim 1, wherein, when the recommended cooking menus have been downloaded on the cooking device, information indicative that the recommended cooking menus have been downloaded is displayed on the screens displayed on the multiple information terminals, and an image indicative that the recommended cooking menus have been downloaded is displayed on a display portion of the cooking device, and the recommended cooking menus having been downloaded are indicated by flickering the image displayed on the display portion.

3. The heating cooking system as claimed in claim 2, wherein the image indicative that the recommended cooking menus have been downloaded is displayed on a region of a main screen of the display portion.

* * * * *